United States Patent
Sethi et al.

(10) Patent No.: US 12,141,571 B2
(45) Date of Patent: Nov. 12, 2024

(54) METHOD AND SYSTEM FOR EXECUTING AN APPLICATION UPGRADE USING NETWORK SLICING

(71) Applicant: Dell Products L.P., Round Rock, TX (US)

(72) Inventors: Parminder Singh Sethi, Ludhiana (IN); Lakshmi Saroja Nalam, Bangalore (IN); Shelesh Chopra, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 168 days.

(21) Appl. No.: 17/871,574

(22) Filed: Jul. 22, 2022

(65) Prior Publication Data

US 2024/0028321 A1    Jan. 25, 2024

(51) Int. Cl.
*G06F 8/65*    (2018.01)
*G06F 21/57*    (2013.01)
(Continued)

(52) U.S. Cl.
CPC .............. *G06F 8/65* (2013.01); *G06F 21/577* (2013.01); *H04L 41/082* (2013.01); *H04L 41/0895* (2022.05); *G06F 2221/033* (2013.01)

(58) Field of Classification Search
CPC ................. G06F 8/65; G06F 8/61; G06F 8/71
See application file for complete search history.

(56) References Cited

U.S. PATENT DOCUMENTS 6,195,760 B1    2/2001    Chung et al.
7,251,745 B2    7/2007    Koch et al.
(Continued)

FOREIGN PATENT DOCUMENTS

CN    106649091 A    5/2017
CN    113612635 A    11/2021
(Continued)

OTHER PUBLICATIONS

Wu, Suzhen et al., "Proactive Data Migration for Improved Storage Availability in Large-Scale Data Centers", 2015, IEEE Transactions on Computers, vol. 64, No. 9, Sep. 2015.
(Continued)

*Primary Examiner* — Duy Khuong T Nguyen
(74) *Attorney, Agent, or Firm* — Chamberlain, Hrdlicka, White, Williams & Aughtry; Aly Dossa

(57) ABSTRACT

A method for managing an application upgrade includes: making a first determination that an urgent fix is received from an application monitoring agent; making, based on the first determination, a second determination that a high priority network slice of a network exists; mapping, based on the second determination, the urgent fix to the high priority network slice; making a third determination that a prerequisite fix is required; mapping the prerequisite fix to the high priority network slice; sending the prerequisite fix and the urgent fix to the reordering engine; reordering at least one fix available in a receiving queue of the reordering engine to prioritize the prerequisite fix and the urgent fix in the receiving queue; sending the prerequisite fix and the urgent fix to a client device upgrade manager; and initiating upgrading of a client device based on the prerequisite fix and the urgent fix.

13 Claims, 16 Drawing Sheets

(51) Int. Cl.
*H04L 41/082* (2022.01)
*H04L 41/0895* (2022.01)

(56) References Cited

U.S. PATENT DOCUMENTS

| | | | |
|---|---|---|---|
| 7,401,248 B2 | 7/2008 | Nakahara et al. | |
| 7,525,749 B2 | 4/2009 | Maejima et al. | |
| 7,590,981 B2 | 9/2009 | Gupta et al. | |
| 7,966,391 B2 | 6/2011 | Anderson et al. | |
| 8,078,448 B1 | 12/2011 | Wohlberg et al. | |
| 8,364,799 B2 | 1/2013 | Sakai | |
| 8,918,673 B1 | 12/2014 | Rangaiah et al. | |
| 9,026,260 B1 | 5/2015 | Thornley et al. | |
| 9,397,930 B2 | 7/2016 | Drobinsky et al. | |
| 9,900,215 B2 | 2/2018 | Yang et al. | |
| 10,785,123 B2 | 9/2020 | Gonguet | |
| 11,424,989 B2 | 8/2022 | Jeuk et al. | |
| 11,588,893 B1 | 2/2023 | Sharma | |
| 11,595,269 B1 | 2/2023 | Ghosh et al. | |
| 11,846,918 B1 | 12/2023 | Mazur | |
| 2002/0138226 A1 | 9/2002 | Doane | |
| 2005/0216800 A1 | 9/2005 | Bicknell et al. | |
| 2006/0129771 A1 | 6/2006 | Dasgupta et al. | |
| 2007/0079170 A1 | 4/2007 | Zimmer et al. | |
| 2007/0198524 A1 | 8/2007 | Branda et al. | |
| 2008/0222218 A1 | 9/2008 | Richards et al. | |
| 2009/0307522 A1 | 12/2009 | Olson et al. | |
| 2011/0113224 A1 | 5/2011 | Isshiki et al. | |
| 2012/0072571 A1 | 3/2012 | Orzell et al. | |
| 2013/0103977 A1 | 4/2013 | Zimmermann | |
| 2014/0376385 A1 | 12/2014 | Boss et al. | |
| 2015/0261518 A1* | 9/2015 | Viswanathan | G06F 8/65 717/168 |
| 2015/0278219 A1 | 10/2015 | Phipps | |
| 2016/0162280 A1 | 6/2016 | Murayama et al. | |
| 2016/0239395 A1 | 8/2016 | Madsen et al. | |
| 2016/0378648 A1 | 12/2016 | Ekambaram | |
| 2018/0113728 A1 | 4/2018 | Musani et al. | |
| 2018/0262979 A1 | 9/2018 | Wang et al. | |
| 2019/0199687 A1 | 6/2019 | Lan | |
| 2019/0310872 A1 | 10/2019 | Griffin | |
| 2019/0379595 A1 | 12/2019 | Ur et al. | |
| 2020/0099773 A1 | 3/2020 | Myers | |
| 2020/0110655 A1 | 4/2020 | Harwood et al. | |
| 2020/0133772 A1 | 4/2020 | Dalmatov et al. | |
| 2020/0156243 A1 | 5/2020 | Ghare et al. | |
| 2020/0264930 A1 | 8/2020 | Mandagere et al. | |
| 2021/0064401 A1 | 3/2021 | Vichare | |
| 2021/0153044 A1 | 5/2021 | Ramanathan et al. | |
| 2021/0165768 A1 | 6/2021 | D'halluin et al. | |
| 2022/0070648 A1 | 3/2022 | Krishan | |
| 2022/0075613 A1* | 3/2022 | Ramachandran | G06F 9/45558 |
| 2022/0138081 A1 | 5/2022 | Varma et al. | |
| 2022/0158926 A1 | 5/2022 | Wennerström et al. | |
| 2022/0164186 A1 | 5/2022 | Pamidala | |
| 2022/0179683 A1 | 6/2022 | Verma et al. | |
| 2022/0272142 A1 | 8/2022 | Li et al. | |
| 2022/0283784 A1 | 9/2022 | Degen et al. | |
| 2022/0337493 A1 | 10/2022 | Sant et al. | |
| 2022/0337501 A1 | 10/2022 | Sant et al. | |
| 2022/0368602 A1 | 11/2022 | Adhav et al. | |
| 2022/0413845 A1 | 12/2022 | Mathew | |
| 2023/0033886 A1 | 2/2023 | Goswami et al. | |
| 2023/0037124 A1 | 2/2023 | Mengwasser et al. | |
| 2023/0080047 A1 | 3/2023 | Bashir | |

FOREIGN PATENT DOCUMENTS

| | | |
|---|---|---|
| WO | 2017214932 A1 | 12/2017 |
| WO | 2021122516 A1 | 6/2021 |
| WO | 2022104396 A1 | 5/2022 |

OTHER PUBLICATIONS

Young et al., "In-Time Safety Assurance Systems for Emerging Autonomous Flight Operations", 2018, pp. 1-10, https://ieeexplore.ieee.org/stamp/stamp.jsp?tp=&arnumber=8569689 (Year: 2018).

* cited by examiner

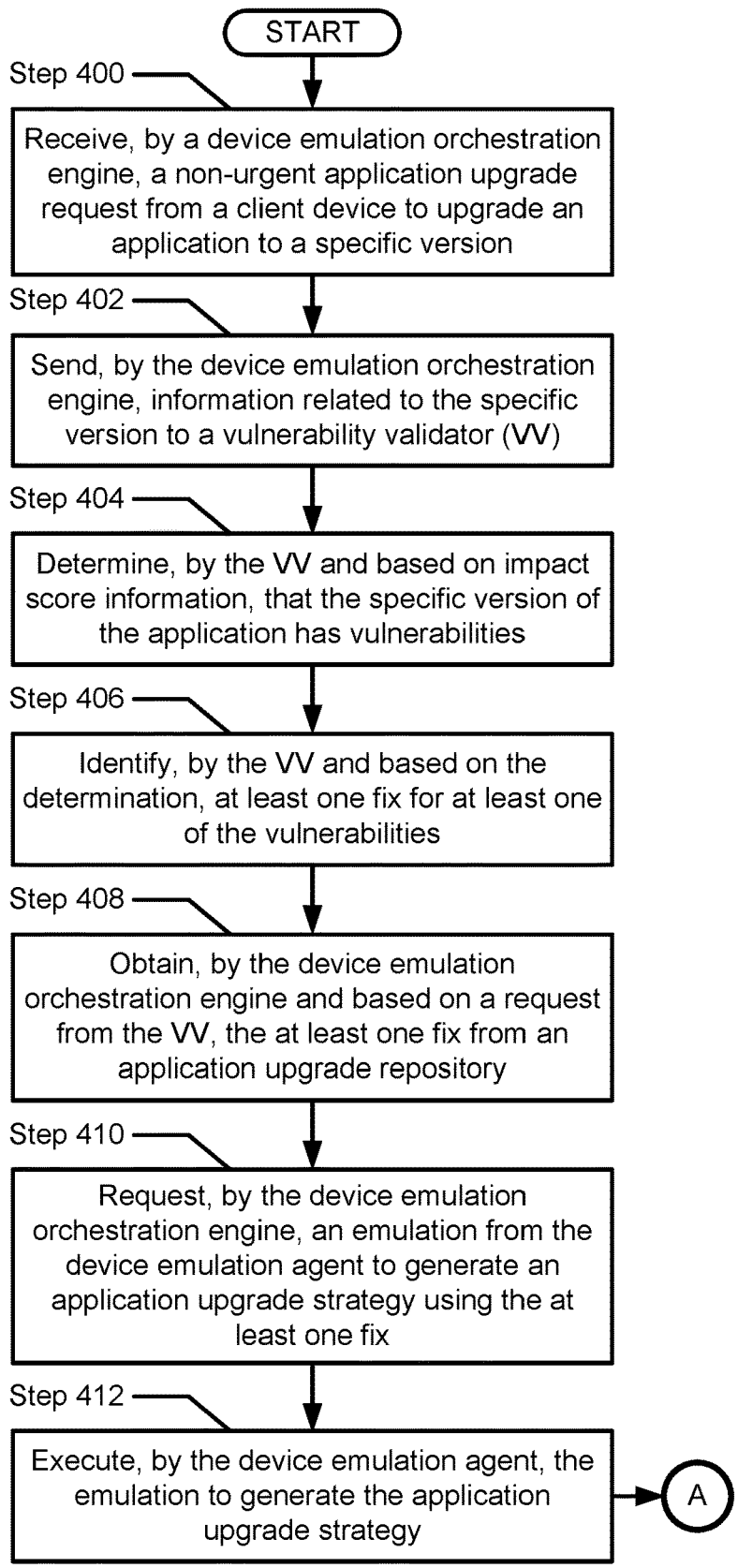
FIG. 4.1

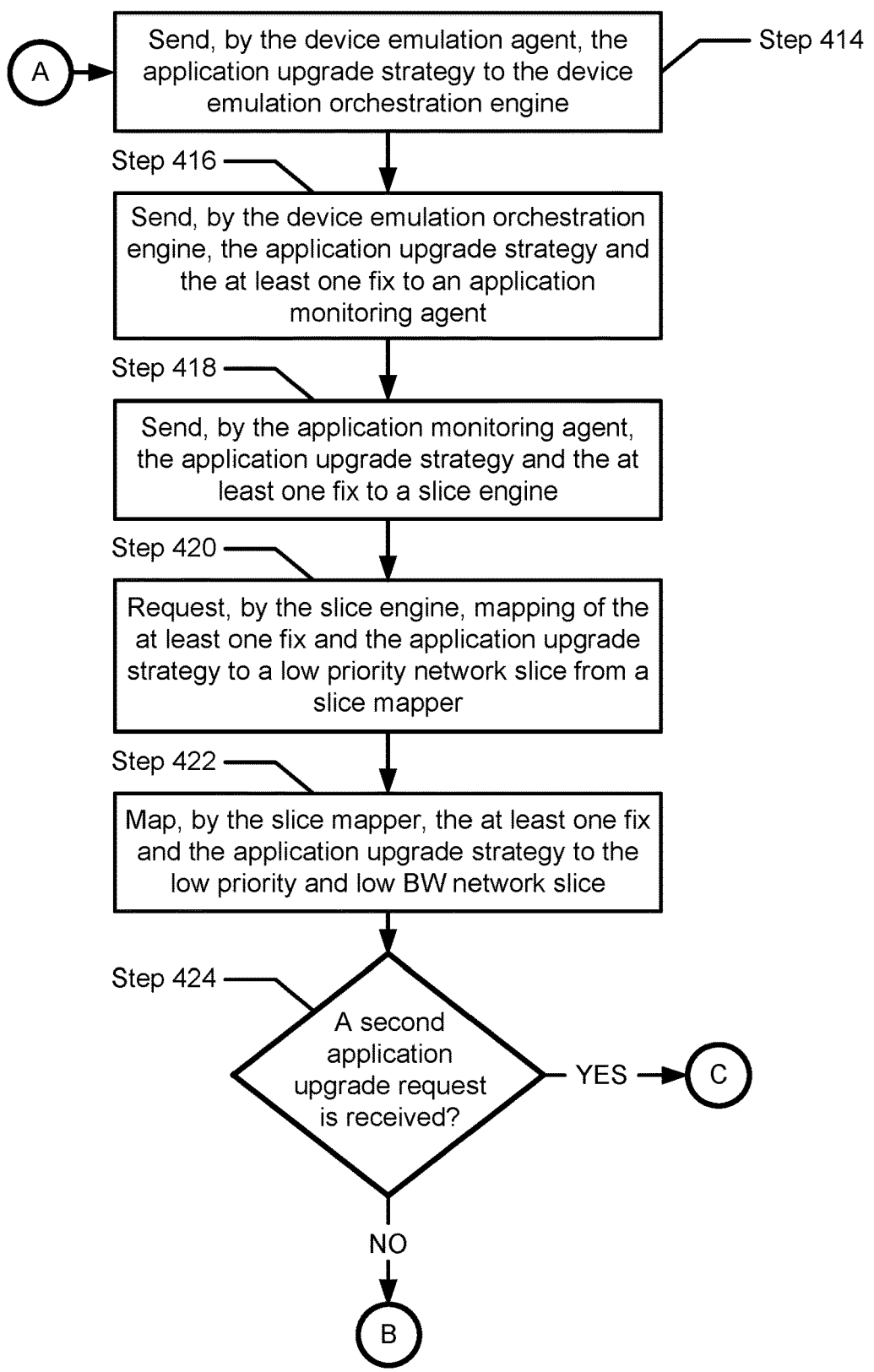
FIG. 4.2

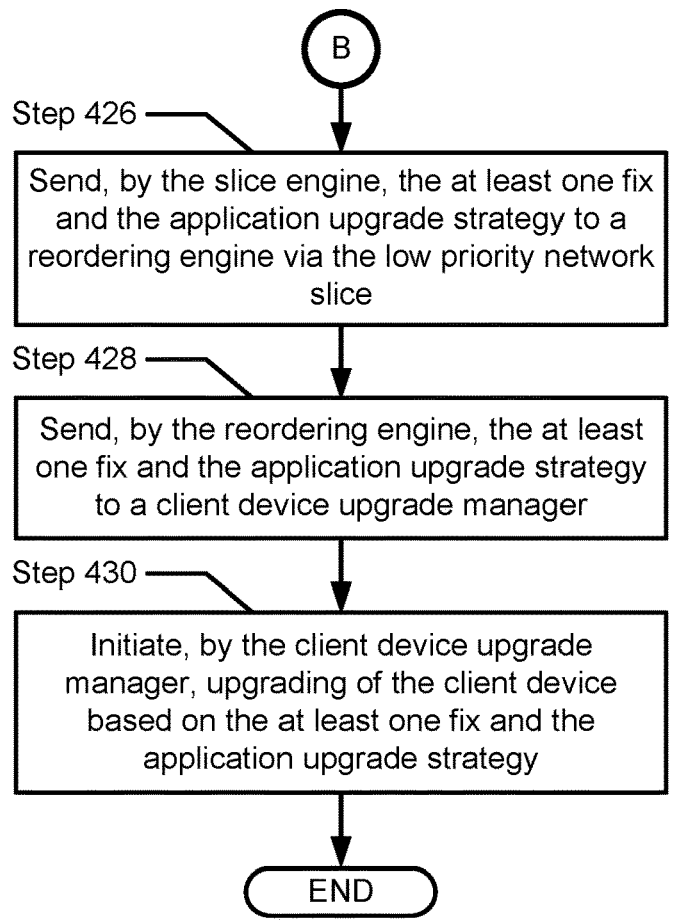
FIG. 4.3

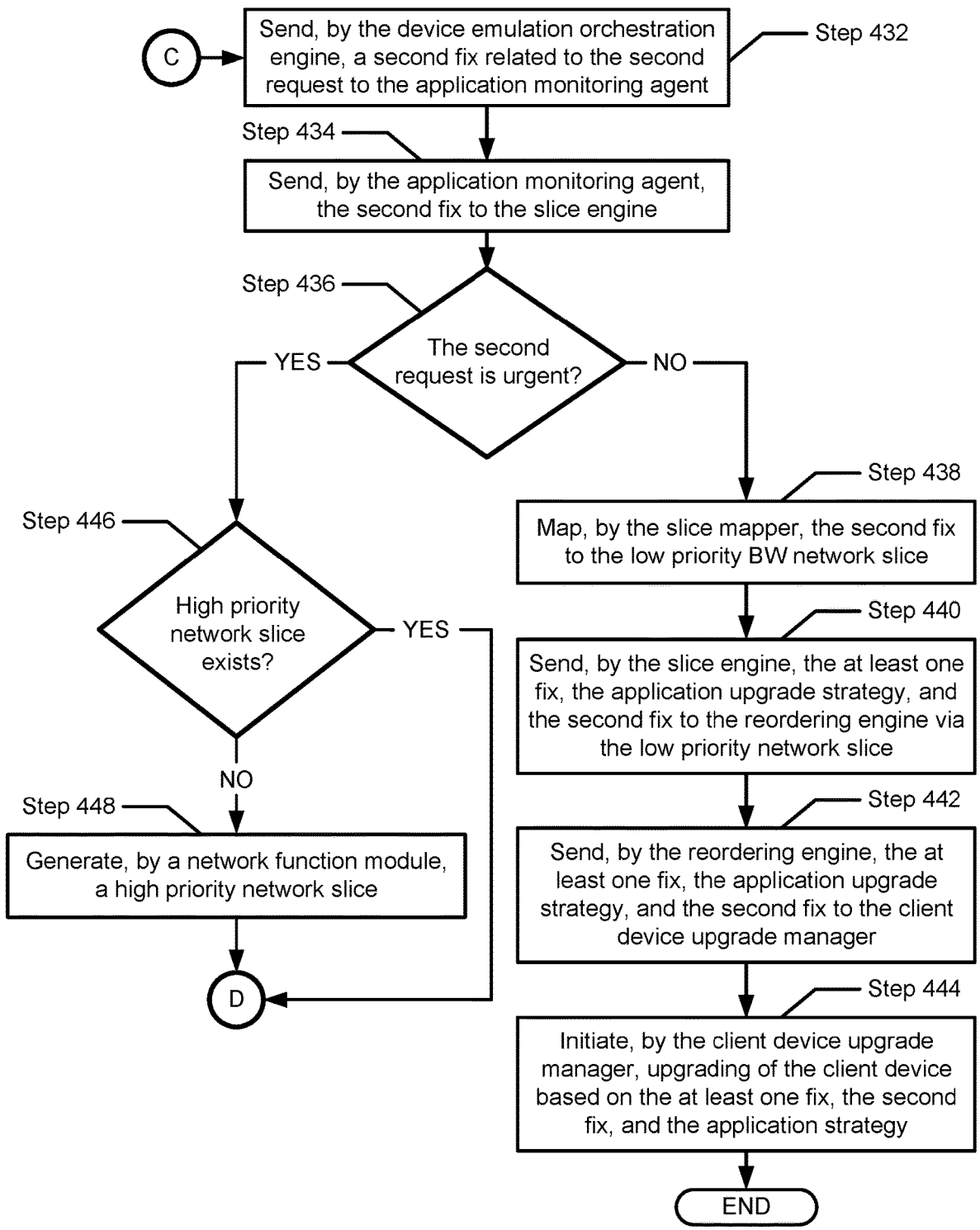
FIG. 4.4

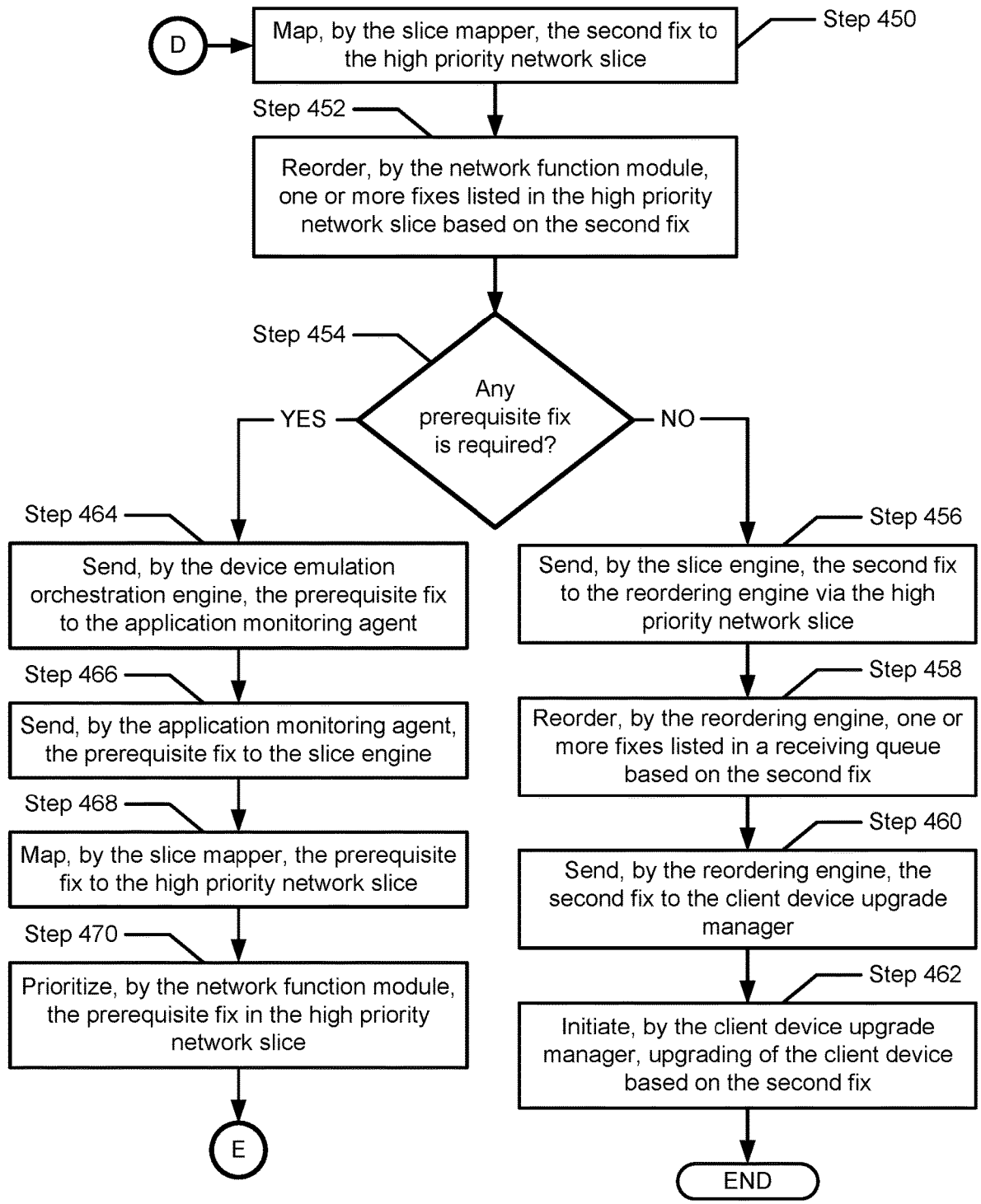
FIG. 4.5

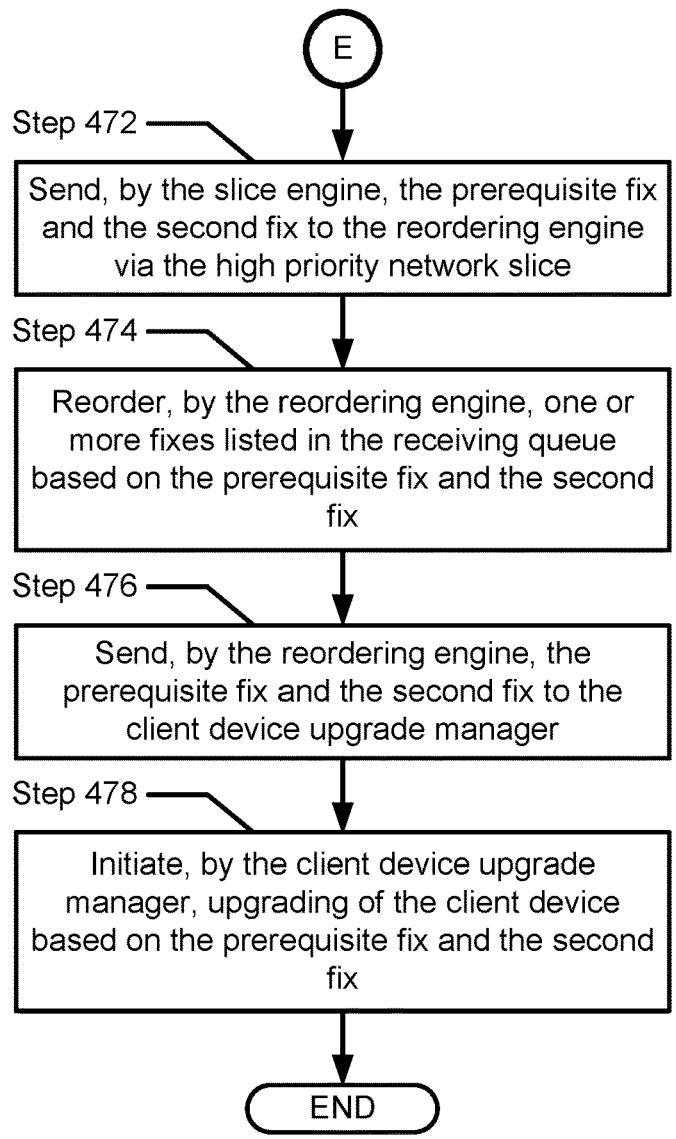
FIG. 4.6

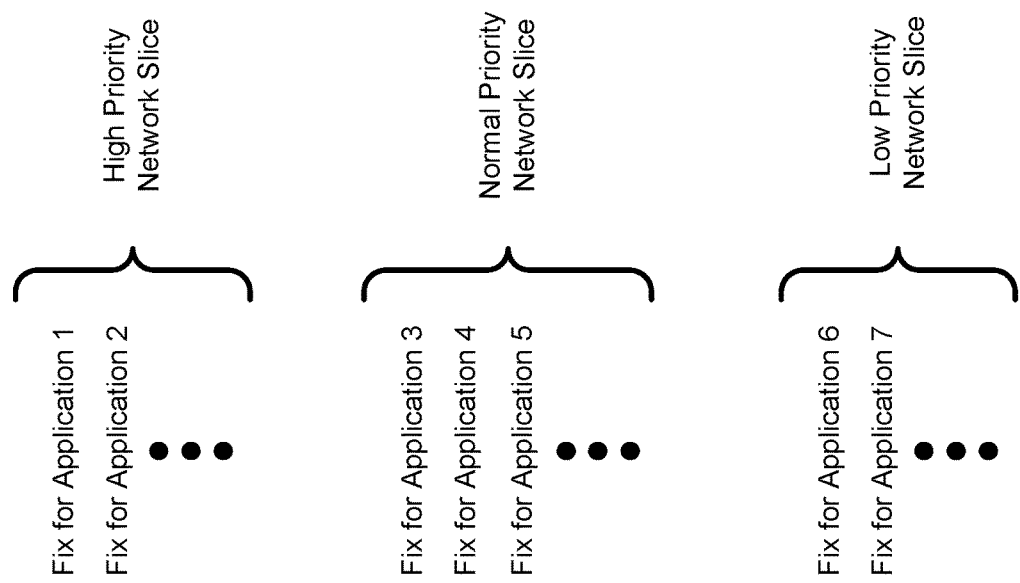
FIG. 6.1

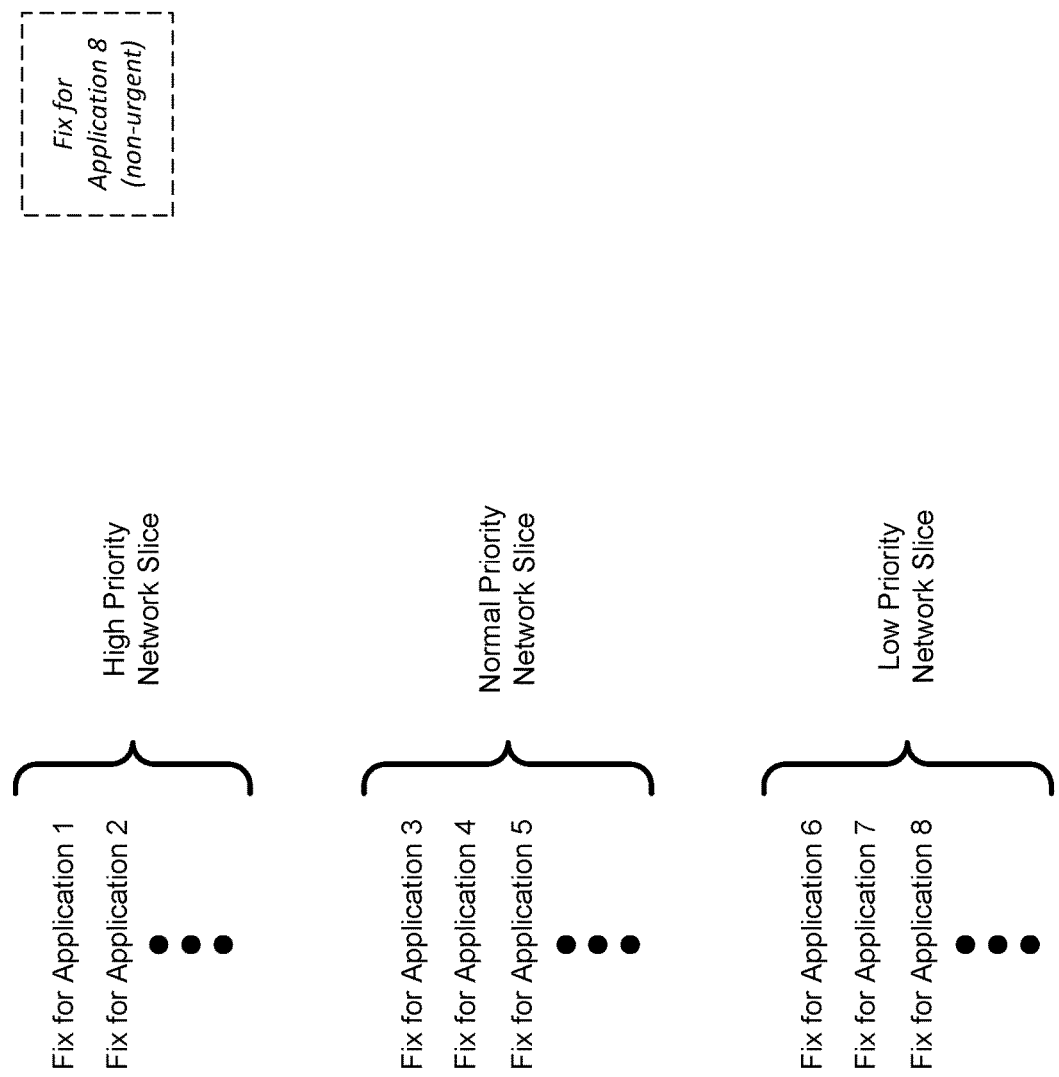
FIG. 6.2

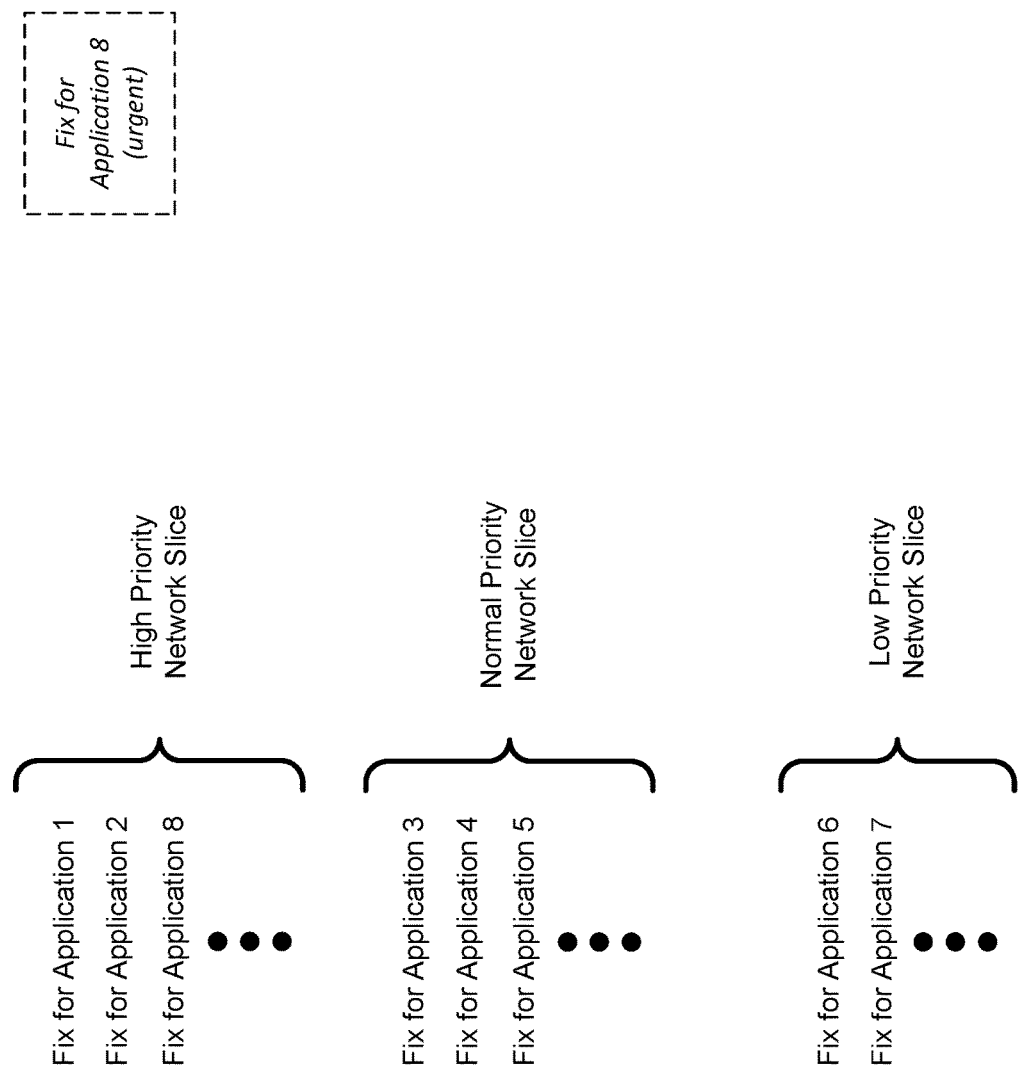
FIG. 6.3

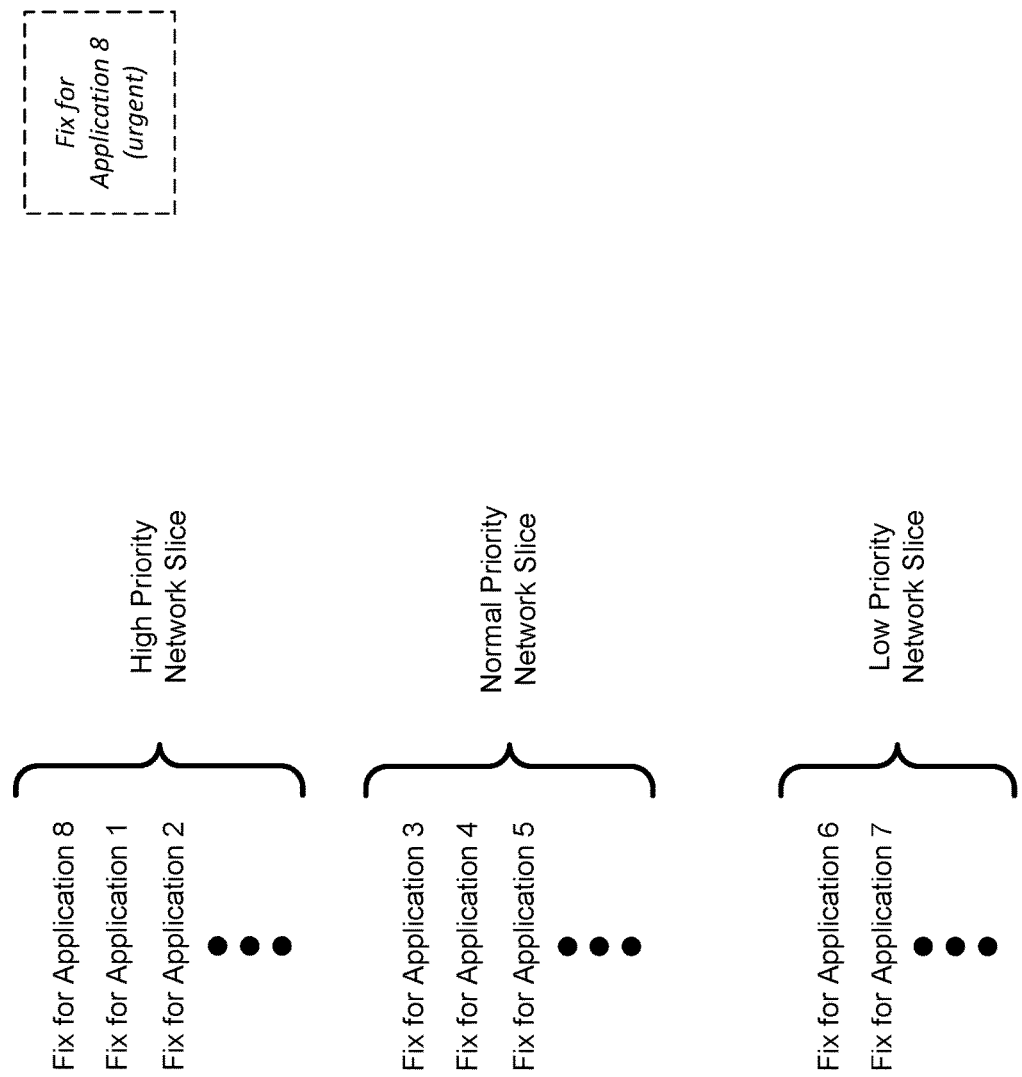
FIG. 6.4

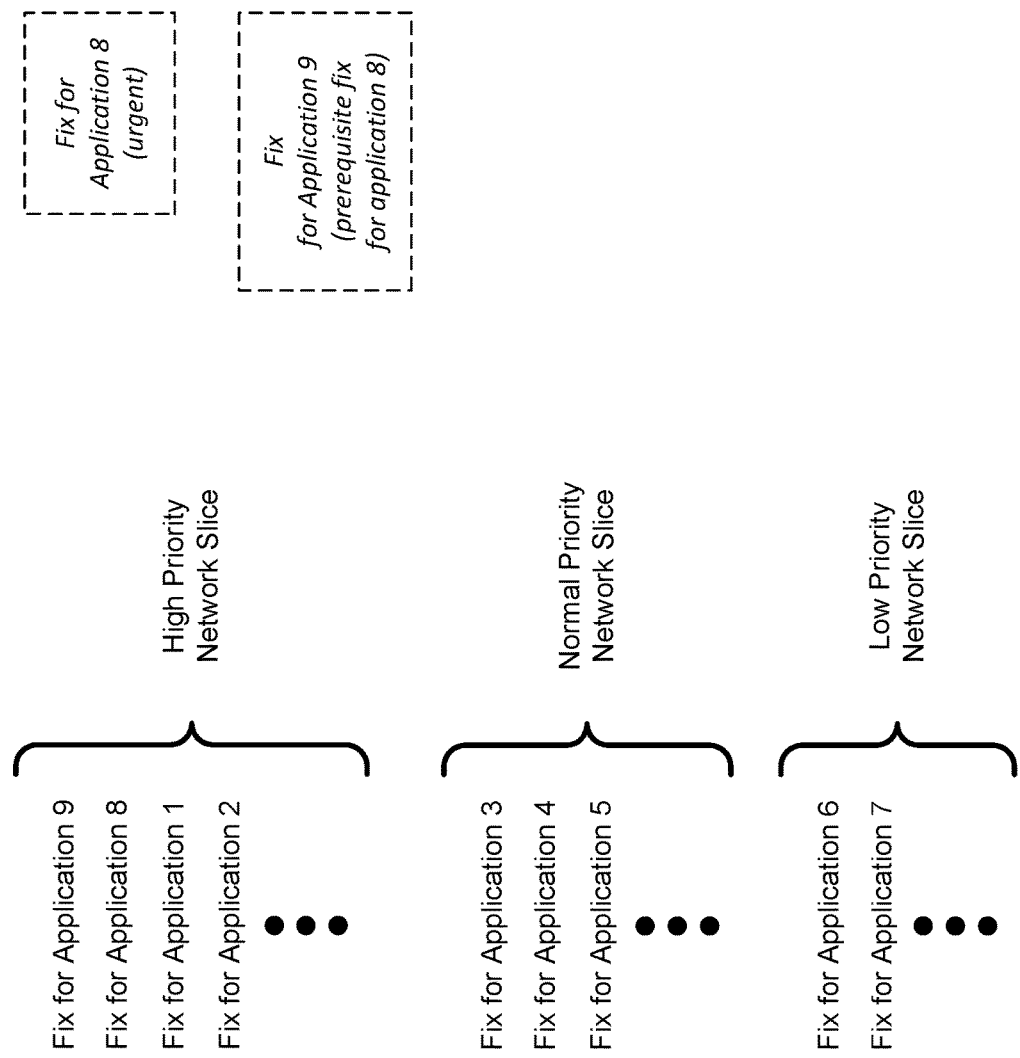
FIG. 6.5

METHOD AND SYSTEM FOR EXECUTING AN APPLICATION UPGRADE USING NETWORK SLICING

BACKGROUND

Computing devices in a system may include any number of internal components such as processors, memory, and persistent storage. The computing devices may execute applications (e.g., software). Each application may be upgraded to a newer version to protect the computing devices from security vulnerabilities of the applications.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIGS. 4.1-4.6 show a method for executing an application upgrade using network slicing in accordance with one or more embodiments of the invention.

FIGS. 6.1-6.5 show a diagram of an example network in accordance with one or more embodiments of the invention.

DETAILED DESCRIPTION

Figure 1:
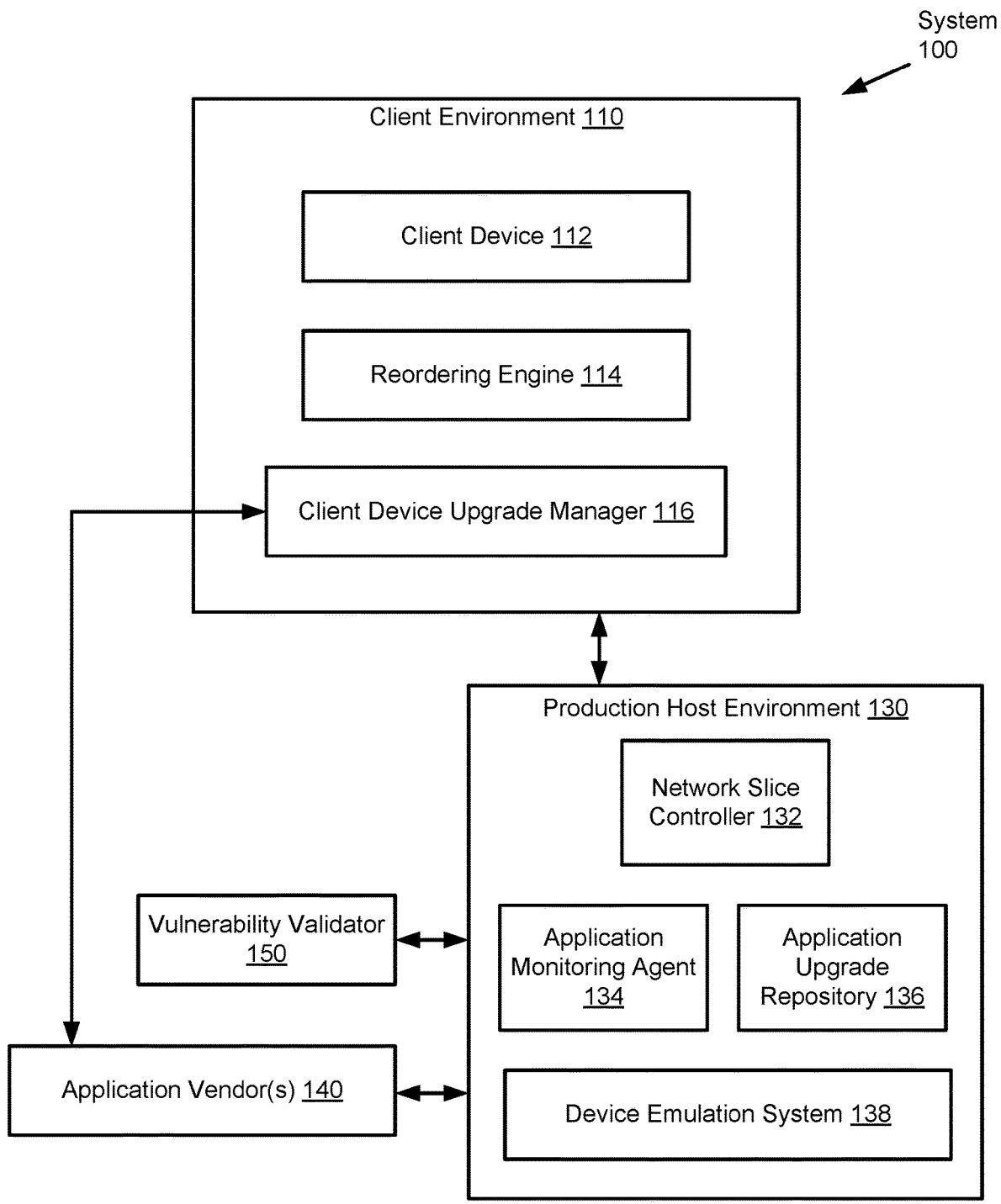
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, when an application upgrade process is being executed, a client device (e.g., a computing device) may not receive a high priority (e.g., an urgent) fix on time. As a result of not receiving the urgent fix on time, a user of the computing device may experience performance degradation in production workloads (e.g., reading data from a table, writing data to the table, etc.). Embodiments of the invention relate to methods and systems for executing an application upgrade using network slicing in order to ensure that the client device receives the high priority fix in a timely manner. More specifically, various embodiments of the invention may make a first determination that an urgent fix is received from an application monitoring agent. Based on the first determination, a second determination may be made to verify that a high priority network slice of a network exists. Based on the second determination, the urgent fix may be mapped to the high priority network slice. After mapping the urgent fix to the high priority network slice, at least one fix available in the high priority network slice may be reordered to prioritize the urgent fix. A third determination may then be made to verify that the urgent fix is dependent on a prerequisite fix. Based on the third determination, the prerequisite fix may be mapped to the high priority network slice and the prerequisite fix may be set to be sent to a reordering engine prior to the urgent fix. The prerequisite fix and the urgent fix may then be sent, via the high priority network slice, to the reordering engine. At least one fix available in a receiving queue of the reordering engine may be reordered to prioritize the prerequisite fix and the urgent fix in the receiving queue. The prerequisite fix and the urgent fix may then be sent to a client device upgrade manager. Finally, upgrading of the client device may be initiated based on the prerequisite fix and the urgent fix. As a result of these processes, one or more embodiments disclosed herein advantageously ensure that the computing device receives the urgent fix on time. In this manner, users may experience less performance degradation during production workloads.

The following describes various embodiments of the invention.

FIG. 1 shows a diagram of a system (100) in accordance with one or more embodiments of the invention. The system (100) includes a client environment (CE) (110), a production host (PH) environment (130), one or more application vendors (140), and a vulnerability validator (VV) (150). The system (100) may include additional, fewer, and/or different components without departing from scope of the invention. Each component may be operably connected to any of the other components via any combination of wired and/or wireless connections. Each component illustrated in FIG. 1 is discussed below.

In one or more embodiments of the invention, the CE (110) may include a client device (112), a reordering engine (114), and a client device upgrade manager (116). The client device (112), the reordering engine (114), and the client device upgrade manager (116) may be physical or logical devices, as discussed below. In one or more embodiments, the CE (110) may include any number of client devices without departing from the scope of the invention.

In one or more embodiments of the invention, the client device (112) may include one or more applications (not shown). The applications may be logical entities executed using computing resources (not shown) of the client device (112). Each of the applications may perform similar or different processes. In one or more embodiments, the applications may provide services to users (e.g., clients (not shown)) of the client device (112). For example, the applications may host services and/or components. The services and/or components may include, but are not limited to: instances of databases, email servers, etc.

Figure 7:
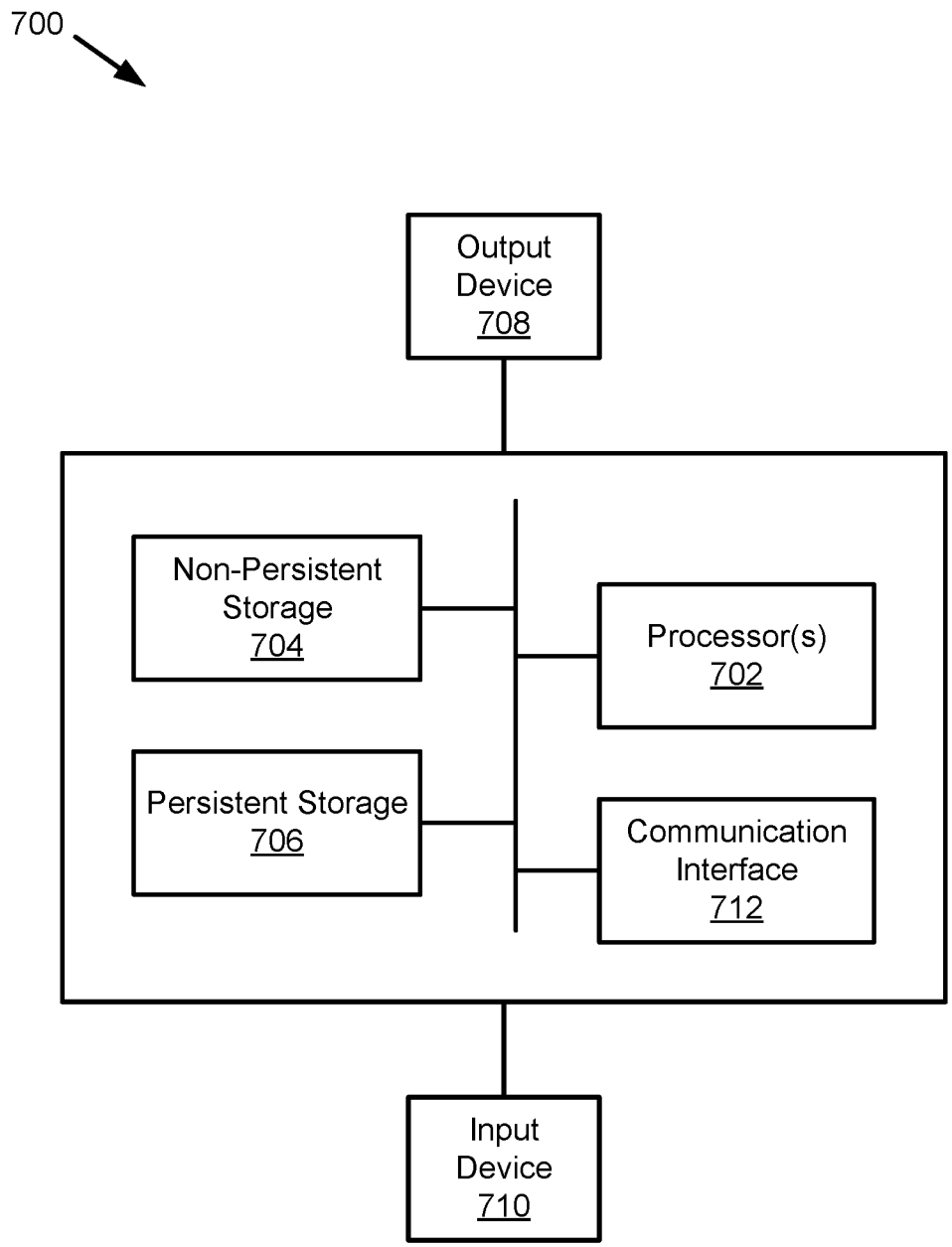
FIG. 7 shows a diagram of a computing device in accordance with one or more embodiments of the invention.

In one or more embodiments of the invention, the client device (112) may be implemented as a computing device (e.g., 700, FIG. 7). The computing device may be, for example, a mobile phone, a tablet computer, a laptop computer, a desktop computer, a server, a distributed computing system, or a cloud resource. The computing device may include one or more processors, memory (e.g., random access memory (RAM)), and persistent storage (e.g., disk drives, solid-state drives (SSDs), etc.). The computing device may include instructions, stored in the persistent storage, that when executed by the processor(s) of the computing device, cause the computing device to perform the functionality of the client device (112) described throughout this application.

Alternatively, in one or more embodiments of the invention, the client device (112) may be implemented as a logical device. The logical device may utilize the computing resources of any number of computing devices to provide the functionality of the client device (112) described throughout this application.

In one or more embodiments of the invention, the applications may be upgraded based on newer versions available for installation. The installation of a newer application version may be performed and/or otherwise initiated (e.g., instantiated, executed, etc.) by the client device upgrade manager (116). The client device upgrade manager (116) may periodically collect information (e.g., device state information, device configuration information, etc.) from the client device (112). The client upgrade manager (116) may also collect information from the client device (112) in real-time (e.g., on the order of milliseconds or less).

In one or more embodiments of the invention, the applications may be implemented as computer instructions, e.g., computer code, stored in persistent storage that when executed by a processor(s) of a computing device cause the computing device (e.g., 700, FIG. 7) to provide the functionality of the applications described throughout this application.

In one or more embodiments of the invention, the client device upgrade manager (116) may then send this information to the application vendor(s) (140) for technical support (e.g., recommendations and/or fixes for hardware and/or software failures) to the client device (112). The application vendor(s) (140) may then provide one or more catalog files (described in more detail below) that specify the requirements of the client device (112) to the PH environment (130).

In one or more embodiments of the invention, the client device upgrade manager (116) may obtain the estimated time that one or more fixes may take. The client device upgrade manager (116) may obtain the time estimation from the PH environment (130). The client device upgrade manager (116) may then provide the time estimation(s) and optimal time slots in which the fixes may be executed to the client device (112).

In one or more embodiments of the invention, the client device upgrade manager (116) may further include functionality of monitoring device configuration information of the client device (112). The device configuration information of the client device (112) may include, but is not limited to: operating system (OS) information of a client device, one or more applications already installed to a client device, current versions of such applications already installed to a client device, processing power of a client device, etc. The device configuration information of the client device (112) may be provided to the PH environment (130).

In one or more embodiments of the invention, the client device upgrade manager (116) may be implemented as a computing device (e.g., 700, FIG. 7). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the client device upgrade manager (116) described throughout this application.

Alternatively, in one or more embodiments of the invention, similar to the client device (112), the client device upgrade manager (116) may also be implemented as a logical device.

Figure 3:
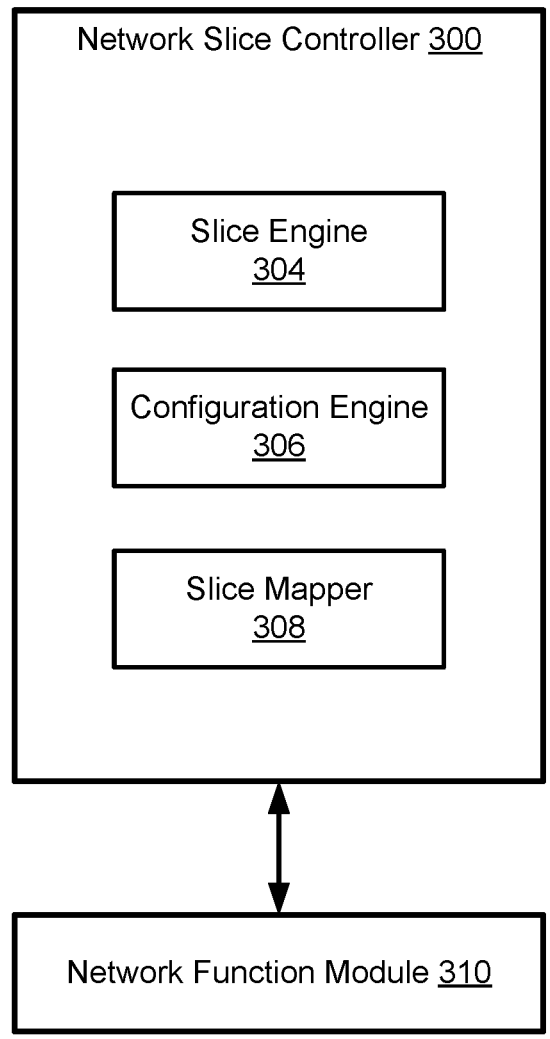
FIG. 3 shows a diagram of a network slice controller in accordance with one or more embodiments of the invention.

In one or more embodiments of the invention, the reordering engine (114) may receive one or more items (e.g., one or more fixes, an application upgrade strategy, etc.) from a slice engine (e.g., 304, FIG. 3). In one or more embodiments, the reordering engine (114) may store the items in persistent storage (not shown) in the order that the items are received; however, as discussed below, the items are not necessarily processed in the order that they are received.

In one or more embodiments of the invention, while storing, the reordering engine (114) may generate an index for each item. Based on the index of each item, the reordering engine (114) may generate a receiving queue that includes the received items that are ordered (or re-ordered)

based on the priority of the items. The reordering engine (114) may then send the items to the client device upgrade manager (116) based on the order of the items in the receiving queue.

In one or more embodiments of the invention, the persistent storage may be a physical computer readable storage medium. For example, the persistent storage may be (or may include) hard disk drives, SSDs, tape drives, or other physical storage media. The persistent storage may be other types of digital storage not listed above without departing from the scope of the invention. Additionally, the persistent storage may be a virtualized storage without departing from the scope of the invention.

In one or more embodiments of the invention, for example, the reordering engine (114) may receive an application upgrade strategy, a fix for application 1, and a fix for application 2, respectively. The reordering engine (114) may then store each item in the persistent storage. In one or more embodiments, the fix for application 1 and the fix for application 2 may be low priority (e.g., non-urgent) fixes. For this reason, the slice engine (e.g., 304, FIG. 3) sends each item to the reordering engine (114) via a low priority network slice (discussed below). The reordering engine (114) may then send the application upgrade strategy, the fix for application 1, and the fix for application 2, respectively, to the client device upgrade manager (116).

Using the example discussed above as a reference, at some later point in time, the reordering engine (114) may receive another fix (e.g., a fix for application 3) from the slice engine (e.g., 304, FIG. 3). The fix for application 3 may be ordered after the fix for application 2 in the receiving queue. In one or more embodiments, the fix for application 3 may be an urgent fix. For this reason, the slice engine (e.g., 304, FIG. 3) sends the fix for application 3 to the reordering engine (114) via a high priority network slice (discussed below).

In one or more embodiments of the invention, the reordering engine (114) may reorder the index of each fix in the receiving queue to reflect the priority of each fix and to prioritize the urgent fix within the receiving queue. In one or more embodiments, without reordering the index of each fix, the receiving queue may not accurately reflect the priority of each fix. For example, without reordering, a layout of the receiving queue may specify: (i) the application upgrade strategy, (ii) the fix for application 1, (iii) the fix for application 2, and (iv) the fix for application 3, respectively.

In one or more embodiments of the invention, after reordering the index of each fix, the receiving queue may reflect the priority of each fix. For example, after reordering, the layout of the receiving queue may specify: (i) the fix for application 3, (ii) the application upgrade strategy, (iii) the fix for application 1, and (iv) the fix for application 2, respectively. Additional details of the reordering process are described below in reference to FIG. 4.5.

The aforementioned example is not intended to limit the scope of the invention.

In one or more embodiments of the invention, the reordering engine (114) may be implemented as a computing device (e.g., 700, FIG. 7). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the reordering engine (114) described throughout this application.

Alternatively, in one or more embodiments of the invention, similar to the client device (112), the reordering engine (114) may also be implemented as a logical device.

Turning back to the PH environment (130), in one or more embodiments of the invention, the PH environment (130) may include a network slice controller (132), an application monitoring agent (134), an application upgrade repository (136), and a device emulation system (138). The production host environment (130) may include additional, fewer, and/or different components without departing from the scope of the invention.

In one or more embodiments of the invention, the PH environment (130) may be implemented as a computing device (e.g., 700, FIG. 7). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the PH environment (130) described throughout this application.

Alternatively, in one or more embodiments of the invention, similar to the client device (112), the PH environment (130) may also be implemented as a logical device.

In one or more embodiments of the invention, the application upgrade repository (136) may store versions of the application(s). The application upgrade repository (136) may be updated by the application vendor(s) (140) based on newer versions of the application(s) being available. The application upgrade repository (136) may further store catalog files related to the application(s) to be installed. The catalog files may include, but are not limited to: a compatible computing device model, a compatible OS (and a corresponding version of such OS), an upgrade sequence, etc.

In one or more embodiments of the invention, the application monitoring agent (134) sends one or more items to the slice engine (e.g., 304, FIG. 3). After receiving the items from the slice engine (e.g., 304, FIG. 3), the reordering engine (114) sends the items to the client device upgrade manager (116). In one or more embodiments, the application monitoring agent (134) may obtain an identifier of the client device (112) that is managed by the client device upgrade manager (116). The application monitoring agent (134) may also obtain the information related to the application(s) already installed to the client device (112) from the client device upgrade manager (116).

In one or more embodiments of the invention, the application monitoring agent (134) may monitor the application upgrade repository (136) to identify the newer application version(s) available in the application upgrade repository (136). The application monitoring agent (134) may then identify a compatible application version for the client device (112). The application monitoring agent (134) may identify the compatible application version using the catalog files related to the application version in the application upgrade repository (136).

In one or more embodiments of the invention, in response to an emulated fix for an application (e.g., an emulation of a fix that is to be performed on an emulated client device (e.g., device A emulation (224), described below in reference to FIG. 2)), the application monitoring agent (134) may initiate an estimation of executing the fix on the client device (112). The estimation may then be provided to the client device upgrade manager (116).

In one or more embodiments of the invention, the application monitoring agent (134) may provide information related to an application to a device emulation orchestration engine (e.g., 210, FIG. 2), which is part of the device emulation system (136). In one or more embodiments, the information related to the application may include, but is not limited to: an application version of an application, supported OS version(s) for an application, etc.

In one or more embodiments of the invention, the application monitoring agent (134) may be implemented as a computing device (e.g., 700, FIG. 7). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the application monitoring agent (134) described throughout this application.

Alternatively, in one or more embodiments of the invention, similar to the client device (112), the application monitoring agent (134) may also be implemented as a logical device.

In one or more embodiments of the invention, the device emulation system (138) may be a system of device emulation containers (e.g., device emulation container A (220), device emulation container L (230), described below in reference to FIG. 2) that may be configured to emulate the client device (112). The emulation of the client device (112) may be used for executing the fix to an emulated device and measuring fix metrics.

In one or more embodiments of the invention, the fix metrics may include, but are not limited to: the time taken to complete the fix, the number of reboots required after executing the fix, etc. Additional details of the device emulation system (138) are described below in reference to FIG. 2.

In one or more embodiments of the invention, the device emulation system (138) may be implemented as a computing device (e.g., 700, FIG. 7). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the device emulation system (138) described throughout this application.

Alternatively, in one or more embodiments of the invention, similar to the client device (112), the device emulation system (138) may also be implemented as a logical device.

In one or more embodiments of the invention, the network slice controller (132) may manage one or more network slices on a shared physical network infrastructure (also referred to herein simply as "network"). For example, the network slice controller (132) may receive one or more fixes and/or an application upgrade strategy from the application monitoring agent (134). The network slice controller (132) may determine an appropriate network slice for each fix (e.g., the fix for application 1, the fix for application 2, etc.) and for the application upgrade strategy. The network slice controller (132) may then map each fix and the application upgrade strategy to the appropriate network slice.

In one or more embodiments of the invention, network slicing may be a form of virtual network architecture that enables one or more logical networks to be executed on top of the network. To be able to execute the logical networks on top of the network, the network slicing may use, for example: a software defined networking (SDN) method, a network function virtualization (NFV) method, etc.

In one or more embodiments of the invention, the network may include two or more computing devices that are connected via any combination of wired and/or wireless connections. In one or more embodiments, the network may be, for example: a local area network (LAN), a wide area network (WAN), a mobile network, a wireless LAN (WLAN), etc. The network may encompass various interconnected, network-enabled subcomponents (not shown) (e.g., switches, routers, gateways, etc.) that may facilitate communications between the above-mentioned system (100) components.

In one or more embodiments of the invention, the network-enabled subcomponents may be capable of: (i) performing one or more communication schemes (e.g., Internet protocol communications, Ethernet communications, etc.), (ii) being configured by one or more computing devices in the network, and (iii) limiting communication(s) on a granular level (e.g., on a per-port level, on a per-sending device level, etc.).

In one or more embodiments of the invention, each logical network, referred to as a "network slice", may encompass an end-to-end virtual network with dedicated storage and/or computing resources. In one or more embodiments, each network slice may, for example: implement a set of network functions, be configured to execute a different set of requirements and/or priorities, be associated with a particular Quality of Service (QoS) class, etc.

In one or more embodiments of the invention, the network may include, but is not limited to: a low priority network slice, a normal priority network slice, a high priority network slice, etc. For example, consider a scenario in which the network has the low priority network slice and the high priority network slice. In this scenario, the network may allocate the same amount of bandwidth (BW) to the high priority network slice and to the low priority network slice. If the network supports a 10 Gigabytes per second (GB/s) BW with 5 milliseconds (ms) latency QoS network capacity, the network slice controller (132) may allocate a 5 GB/s BW with 30 ms latency QoS network capacity to each of the network slices.

In one or more embodiments of the invention, a BW of a network slice may refer to a volume of information (e.g., data) that can be transmitted over the network slice in a transmission window. The transmission window may be a period of time, with a definite start and end, within which a data transmission is set to be completed.

In one or more embodiments of the invention, to be able to transmit an urgent fix, the network slice controller (132) may allocate more network capacity to the high priority network slice than the low priority network slice. Using the example discussed above as a reference, the network slice controller (132) may allocate a 7 GB/s BW with 15 ms latency QoS network capacity to the high priority network slice and a 3 GB/s BW with 35 ms latency QoS network capacity to the low priority network slice.

As yet another example, consider a scenario in which the network has the low priority network slice, the normal priority network slice, and the high priority network slice. In this scenario, based on the example discussed above as a reference, the network slice controller (132) may allocate: (i) a 5 GB/s BW with 25 ms latency QoS network capacity to the high priority network slice, (ii) a 3 GB/s BW with 35 ms latency QoS network capacity to the normal priority network slice, and (iii) a 2 GB/s BW with 50 ms latency QoS network capacity to the low priority network slice.

In one or more embodiments of the invention, a network function module (e.g., 310, FIG. 3) may generate the above-mentioned network slices. The network function module (e.g., 310, FIG. 3) may generate a network slice based on a quality of communication over the network requested by a configuration engine (e.g., 306, FIG. 3). In one or more embodiments, the configuration engine (e.g., 306, FIG. 3) may determine the quality of communication based on configuration instructions available in the configuration engine (e.g., 306, FIG. 3).

In one or more embodiments of the invention, the configuration engine (e.g., 306, FIG. 3) may determine the quality of communication by measuring the network's QoS. In one or more embodiments, the QoS may include one or more hardware and/or software components to guarantee the network's ability to transmit urgent fixes under limited network capacity. The hardware and/or software components operating on the network may accomplish this by implementing differentiated handling (e.g., a networking approach to classify and manage QoS on the network) and capacity allocation. In one or more embodiments, parameters that can be used to measure the QoS may include, but are not limited to: BW, latency, jitter, error rate, etc.

In one or more embodiments of the invention, for a low priority fix, the configuration engine (e.g., 306, FIG. 3) may request a low priority network slice that implements a low BW network capacity. Based on receiving the request from the configuration engine (e.g., 306, FIG. 3), the network function module (e.g., 310, FIG. 3) may generate the low priority network slice. In one or more embodiments, the low priority network slice may provide a 2 GB/s BW with 50 ms latency QoS network capacity.

In one or more embodiments of the invention, for a normal priority (e.g., non-urgent) fix, the configuration engine (e.g., 306, FIG. 3) may request a normal priority network slice that implements a normal BW network capacity. Based on receiving the request from the configuration engine (e.g., 306, FIG. 3), the network function module (e.g., 310, FIG. 3) may generate the normal priority network slice. In one or more embodiments, the normal priority network slice may provide a 3 GB/s BW with 35 ms latency QoS network capacity.

In one or more embodiments of the invention, for a high priority fix, the configuration engine (e.g., 306, FIG. 3) may request a high priority network slice that implements a high BW network capacity. Based on receiving the request from the configuration engine (e.g., 306, FIG. 3), the network function module (e.g., 310, FIG. 3) may generate the high priority network slice. In one or more embodiments, the high priority network slice may provide a 5 GB/s BW with 25 ms latency QoS network capacity.

In one or more embodiments of the invention, the network slice controller (132) may be implemented as a computing device (e.g., 700, FIG. 7). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the network slice controller (132) described throughout this application.

Alternatively, in one or more embodiments of the invention, similar to the client device (112), the network slice controller (132) may also be implemented as a logical device.

In one or more embodiments of the invention, the VV (150) may determine one or more vulnerabilities of an application to be installed on the client device (112). In one or more embodiments, the VV (150) may include a forest tree database (see, e.g., FIG. 5) to determine the vulnerabilities of the application to be installed. The forest tree database may be a database (or any logical container) to and from which related digital data (or any granularity thereof) may be stored and retrieved, respectively. The forest tree database may include, but is not limited to: an impact score information of an application, an impact score of a subcomponent of an application, a version information of an application, etc. Additional details of the vulnerability determination process are described below in reference to FIG. 5.

In one or more embodiments of the invention, the client device upgrade manager (116) may receive an application upgrade request from the client device (112), which further sends the request to application monitoring agent (134). The application monitoring agent (134) may then send the request to a device emulation orchestration engine (e.g., 210, FIG. 2).

In one or more embodiments of the invention, the request may specify upgrading an application to a specific version (e.g., upgrading from application version 1.2 (v1.2) to v1.3). The device emulation orchestration engine (e.g., 210, FIG. 2) may obtain information of application v1.3 from the application upgrade repository (136) via the application monitoring agent (134). The device emulation orchestration engine (e.g., 210, FIG. 2) may then send the information of the application v1.3 to the VV (150).

In one or more embodiments of the invention, based on the impact score information of the application v1.3, the VV (150) may determine that the application v1.3 has one or more vulnerabilities. The VV (150) may then identify at least one fix for at least one of the vulnerabilities. The VV (150) may request from the device emulation orchestration engine (e.g., 210, FIG. 2) to obtain the at least one fix from the application upgrade repository (136). After obtaining the at least one fix, the device emulation orchestration engine (e.g., 210, FIG. 2) sends the at least one fix to a device emulation agent (e.g., 222, FIG. 2). The device emulation agent (e.g., 222, FIG. 2) may then use the at least one fix to generate the application upgrade strategy (not shown).

In one or more embodiments of the invention, the VV (150) may be implemented as a computing device (e.g., 700, FIG. 7). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the VV (150) described throughout this application.

Alternatively, in one or more embodiments of the invention, similar to the client device (112), the VV (150) may also be implemented as a logical device.

Figure 2:
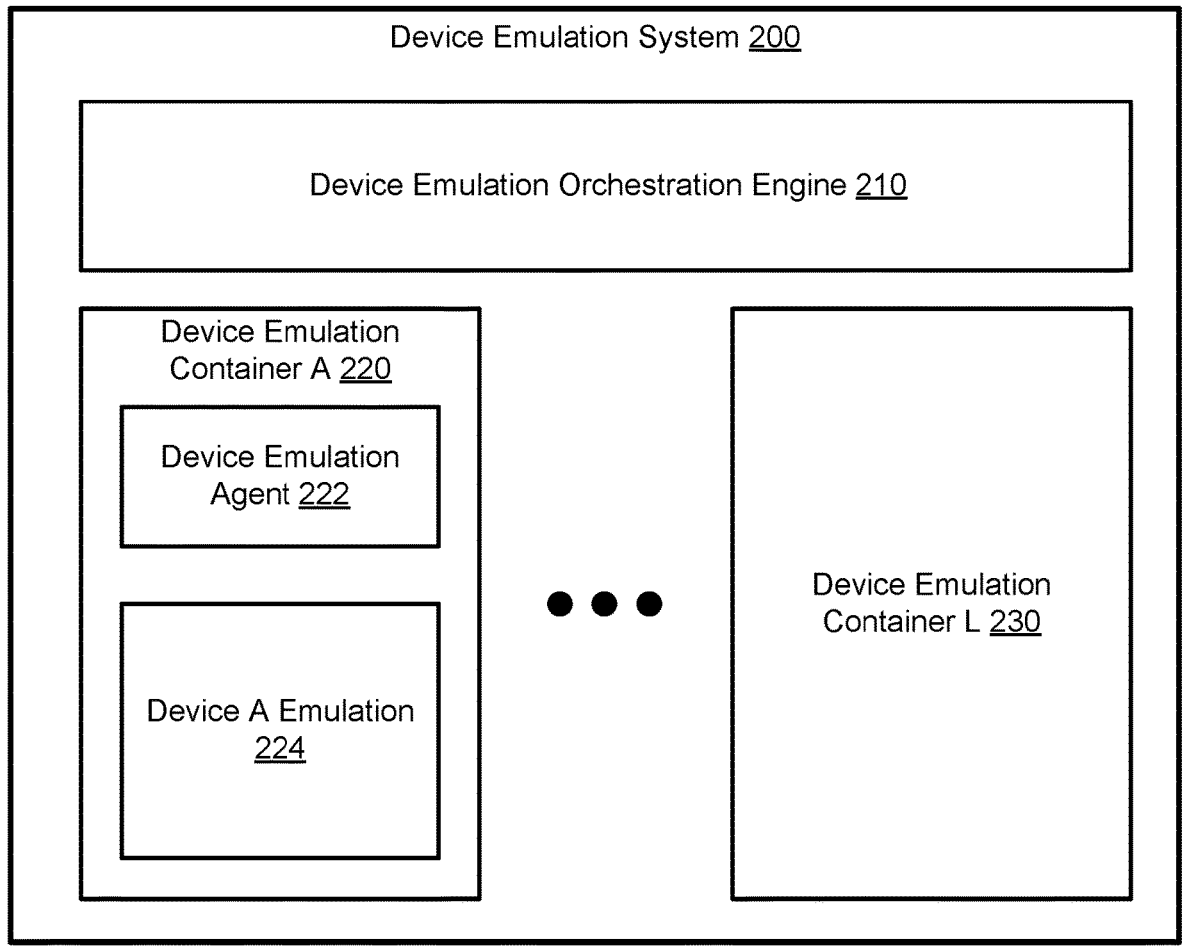
FIG. 2 shows a diagram of a device emulation system in accordance with one or more embodiments of the invention.

Turning now to FIG. 2, FIG. 2 shows a diagram of a device emulation system (200) in accordance with one or more embodiments of the invention. The device emulation system (200) may be an example of the device emulation system (e.g., 138, FIG. 1) discussed above, in which the device emulation system (e.g., 138, FIG. 1) emulates the client device (e.g., 112, FIG. 1). The device emulation system (200) may include the device emulation orchestration engine (210) and one or more device emulation containers (device emulation container A (220), device emulation container L (230)). The device emulation system (200) may include additional, fewer, and/or different components without departing from the scope of the invention. Each component may be operably connected to any of the other component via any combination of wired and/or wireless connections. Each component illustrated in FIG. 2 is discussed below.

In one or more embodiments of the invention, the device emulation orchestration engine (210) orchestrates the generation of the device emulation containers (device emulation container A (220), device emulation container L (230)). For example, the device emulation orchestration engine (210) may receive request(s) from the application monitoring agent (e.g., 134, FIG. 1) to emulate a fix for an application on an emulated client device (e.g., device A emulation (224)). The device emulation orchestration engine (210) may then initiate the emulation of the client device (e.g., 112, FIG. 1) and the fix.

In one or more embodiments of the invention, the device emulation orchestration engine (210) may be implemented as a computing device (e.g., 700, FIG. 7). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the device emulation orchestration engine (210) described throughout this application.

Alternatively, in one or more embodiments of the invention, similar to the client device (e.g., 112, FIG. 1), the device emulation orchestration engine (210) may also be implemented as a logical device.

In one or more embodiments of the invention, the device emulation containers (device emulation container A (220), device emulation container L (230)) may include the device emulation agent (222) that monitors one or more fixes executing on the emulated client device (device A emulation (224)). More specifically, the device emulation agent (222) may monitor, for example, the fixes executed on the emulated client device (device A emulation (224)) to measure the time taken to execute each fix and to track the number of reboots performed after each fix.

In one or more embodiments of the invention, the monitored parameters may then be used to evaluate the fix(es) and, based on this evaluation, to determine whether the fix(es) should be pushed out to the client device (e.g., 112, FIG. 1).

In one or more embodiments of the invention, the device emulation agent (222) may perform an emulation to generate an application upgrade strategy for the emulated client device (device A emulation (224)). The device emulation agent (222) may provide the application upgrade strategy to the device emulation orchestration engine (210). The device emulation orchestration engine (210) may then provide the application upgrade strategy to the application monitoring agent (e.g., 134, FIG. 1). In one or more embodiments, the application upgrade strategy may be generated based on the available fixes for the client device (e.g., 112, FIG. 1) in the application upgrade repository (e.g., 136, FIG. 1).

In one or more embodiments of the invention, the application upgrade strategy may be generated in an iterative manner. For example, multiple application upgrade strategies may be evaluated to find the most efficient application upgrade strategy for executing the fixes on the emulated client device (device A emulation (224)). For this purpose, hardware capabilities of the emulated client device (device A emulation (224)), including, but not limited to, storage capability of the RAM, processing power of one or more processors may be taken into account while generating the application upgrade strategies. Other hardware capabilities of the emulated client device (device A emulation (224)) not listed above may also be taken into account without departing from the scope of the invention.

In one or more embodiments of the invention, the device emulation agent (222) may be implemented as a computing device (e.g., 700, FIG. 7). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the device emulation agent (222) described throughout this application.

Alternatively, in one or more embodiments of the invention, similar to the client device (e.g., 112, FIG. 1), the device emulation agent (222) may also be implemented as a logical device.

Turning now to FIG. 3, FIG. 3 shows a diagram of a network slice controller (300) in accordance with one or more embodiments of the invention. The network slice controller (300) may be an example of the network slice controller (e.g., 132, FIG. 1) discussed above, in which the network slice controller (e.g., 132, FIG. 1) manages the slices of the network. The network slice controller (300) may include a slice engine (304), a configuration engine (306), and a slice mapper (308). The network slice controller (300) may be operably connected to a network function module (310). The network slice controller (300) may include additional, fewer, and/or different components without departing from the scope of the invention. Each component may be operably connected to any of the other component via any combination of wired and/or wireless connections. Each component illustrated in FIG. 3 is discussed below.

In one or more embodiments of the invention, the slice engine (304), the configuration engine (306), the slice mapper (308), and the network function module (310) may be physical or logical devices, as discussed below.

In one or more embodiments of the invention, the slice engine (304) may receive the application upgrade strategy and the least one fix from the application monitoring agent (e.g., 134, FIG. 1). In one or more embodiments, based on receiving the application upgrade strategy and the at least one fix, the slice engine (304) may make an application programming interface (API) call to the application upgrade repository (e.g., 136, FIG. 1) to access metadata of the at least one fix.

In one or more embodiments of the invention, an API call may refer to a process of an application submitting a request to an API to retrieve the requested data from an external application. An API may represent a collection of methods and procedures (e.g., retrieving information about an API source, updating the API source, etc.) that may be executed by one or more applications in a computing device (e.g., 700, FIG. 7). The collection of methods and procedures may be designed and configured to facilitate the slice engine's (304) access to manipulate the application upgrade repository (e.g., 136, FIG. 1).

In one or more embodiments of the invention, based on receiving the API call from the slice engine (304), the application upgrade repository (e.g., 136, FIG. 1) may allow the slice engine (304) to access the metadata of the at least one fix. In one or more embodiments, the metadata may include, but is not limited to: a size of a fix, a type of a fix, a priority of a fix, information of supported client device configuration(s), information of a prerequisite fix, etc.

In one or more embodiments of the invention, the size (e.g., 5 Megabytes (5 MB), 5 GB, etc.) of the fix may specify how much storage of persistent storage will be consumed by the fix. In one or more embodiments, the type of the fix may specify one or more characteristics of the fix. The type of the fix may specify, for example, that: the fix is a corrective fix, the fix is a functional fix, etc.

In one or more embodiments of the invention, the priority of the fix may specify a priority class of an application that requires the fix. The priority class may be based on, for example: an application's tolerance for downtime, a size of an application, a relationship of an application to other applications, etc.

In one or more embodiments of the invention, one or more applications may be classified based on each application's tolerance for downtime. For example, based on the classification, an application may be assigned to one of three classes such as class I, class II, and class III. In one or more embodiments, a class I application may be an application that cannot tolerate downtime. A class II application may be an application that can tolerate a period of downtime (e.g., an hour or other period of time determined by an administrator or a user). A class III application may be an application that can tolerate any amount of downtime.

In one or more embodiments of the invention, the information of supported client device configuration(s) may specify the minimum hardware and/or software configurations required to execute the fix on the client device (e.g., 112, FIG. 1). The minimum hardware and/or software configurations may include, but are not limited to: a name of an OS, 8 GB dynamic RAM (DRAM), a central processing unit (CPU) with 8 cores, 80 GB SSD storage, a depth-first graphics processing unit (GPU) with 1 GB GPU frame buffer, a 1 GB/s BW data processing unit (DPU) with 1 GB frame buffer, etc.

In one or more embodiments of the invention, the information of the prerequisite fix may specify a name of the prerequisite fix that needs to be executed (or implemented) prior to or before implementing a fix on the client device (e.g., 112, FIG. 1). In one or more embodiments, the fix may be dependent on the prerequisite fix and the prerequisite fix may be a non-urgent fix or an urgent fix.

In one or more embodiments of the invention, for example, if a user of the client device (e.g., 112, FIG. 1) has requested to upgrade an application from v1.1 to v1.3, the slice engine (304) may analyze the information of the prerequisite fix. The slice engine (304) may then verify the information of the prerequisite fix from the application upgrade strategy. During the verification process, the slice engine (304) may identify the dependency of the fix (e.g., a fix for v1.3) on other fixes in the application upgrade strategy.

In one or more embodiments of the invention, based on a result of the verification process, the slice engine (304) may make an API call to the device emulation orchestration engine (e.g., 210, FIG. 2). The slice engine (304) may provide the name (e.g., a fix for v1.2) of the prerequisite fix in the API call. Based on receiving the API call from the slice engine (304), the device emulation orchestration engine (e.g., 210, FIG. 2) may obtain the prerequisite fix from the application upgrade repository (e.g., 136, FIG. 1). The device emulation orchestration engine (e.g., 210, FIG. 2) may then send the prerequisite fix to the application monitoring agent (e.g., 134, FIG. 1), which further sends the prerequisite fix to the slice engine (304).

In one or more embodiments of the invention, the slice engine (304) may be implemented as a computing device (e.g., 700, FIG. 7). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the slice engine (304) described throughout this application.

Alternatively, in one or more embodiments of the invention, similar to the client device (e.g., 112, FIG. 1), the slice engine (304) may also be implemented as a logical device.

In one or more embodiments of the invention, the slice engine (304) may then send the fix, the prerequisite fix, and metadata of each fix to the configuration engine (306). In one or more embodiments, the configuration engine (306) may include one or more configuration instructions. Based on the metadata of each fix, the configuration instructions may specify which fix should be mapped to which network slice. In one or more embodiments, the configuration instructions may be set by a manufacturer of the configuration engine (306). Alternatively, the configuration instructions may also be set by an administrator or a user of the configuration engine (306).

In one or more embodiments of the invention, for example, the metadata of the fix for v1.3 may specify, but is not limited to, that: the fix for v1.3 is a class I fix, the size of the fix for v1.3 is 5 GB, the fix for v1.3 requires the prerequisite fix (e.g., the fix for v1.2), etc. In this manner, the configuration instructions may specify that the prerequisite fix and the fix for v1.3 should be mapped to the high priority network slice. The configuration instructions may also specify other information not listed above without departing from the scope of the invention. Additional details of the network slice mapping process are described below in reference to FIG. 4.5.

In one or more embodiments of the invention, as yet another example, metadata of a fix for v2.0 may specify, but is not limited to: the fix for v2.0 is a class III fix, the size of the fix for v2.0 is 10 MB, etc. In this manner, the configuration instructions may specify that the fix for v2.0 should be mapped to the low priority network slice.

In one or more embodiments of the invention, the configuration engine (306) may be implemented as a computing device (e.g., 700, FIG. 7). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the configuration engine (306) described throughout this application.

Alternatively, in one or more embodiments of the invention, similar to the client device (e.g., 112, FIG. 1), the configuration engine (306) may also be implemented as a logical device.

In one or more embodiments of the invention, the configuration engine (306) sends the configuration instruction(s) of each fix to the slice mapper (308). In one or more embodiments, based on the configuration instructions, the slice mapper (308) may map each fix to a corresponding network slice. For example, based on the configuration instructions, the slice mapper (308) may map the fixes for v1.2 and v1.3 to the high priority network slice.

In one or more embodiments of the invention, for example, if the slice mapper (308) determines that the network does not include any high priority network slice, the slice mapper (308) may make an API call to the network function module (310) to request the generation of a high priority network slice. In one or more embodiments, based on receiving the API call from the slice mapper (308), the network function module (310) may generate the high priority network slice. The network function module (310) may then notify the slice mapper (308) about the completion of the generation of the high priority network slice. After receiving the notification, the slice mapper (308) may map the fixes for v1.2 and v1.3 to the high priority network slice.

As yet another example, based on the configuration instructions, the slice mapper (308) may map the fix for v2.0 to the low priority network slice. In one or more embodiments, if a utilization threshold of the low priority network slice is exceeded, the slice mapper (308) may map the fix for v2.0 to the normal priority network slice.

In one or more embodiments of the invention, the slice mapper (308) may be implemented as a computing device (e.g., 700, FIG. 7). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the slice mapper (308) described throughout this application.

Alternatively, in one or more embodiments of the invention, similar to the client device (e.g., 112, FIG. 1), the slice mapper (308) may also be implemented as a logical device.

In one or more embodiments of the invention, the network function module (310) may be implemented as a computing device (e.g., 700, FIG. 7). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the network function module (310) described throughout this application.

Alternatively, in one or more embodiments of the invention, similar to the client device (e.g., 112, FIG. 1), the network function module (310) may also be implemented as a logical device.

FIGS. 4.1-4.6 show a method for executing an application upgrade using network slicing in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 4.1, the method shown in FIG. 4.1 may be executed by, for example, the above-discussed device emulation orchestration engine (e.g., 210, FIG. 2), the VV (e.g., 150, FIG. 1), and the device emulation agent (e.g., 222, FIG. 2). Other components of the system (100) illustrated in FIG. 1 may also execute all or part of the method shown in FIG. 4.1 without departing from the scope of the invention.

In Step 400, the device emulation orchestration engine may receive a non-urgent application upgrade request from the client device (e.g., 112, FIG. 1) to upgrade an application to a specific version. In one or more embodiments, the request may first be received by the client device upgrade manager (e.g., 116, FIG. 1). The client device upgrade manager may then send the request to the application monitoring agent (e.g., 134, FIG. 1), which further sends the request to the device emulation orchestration engine.

In one or more embodiments of the invention, based on receiving the request from the client device, the client device upgrade manager may obtain information from the client device. The obtained information may include, but is not limited to: a name of a specific application version, a current version of an OS, a number of CPUs, an amount of memory available, a number of applications executing, an amount of persistent storage available, etc. The client device upgrade manager may then send the information to the application monitoring agent, which further sends the information to the device emulation orchestration engine.

In Step 402, the device emulation orchestration engine sends information related to the specific version to the VV. In one or more embodiments, the information related to the specific version may be the above-discussed information in reference to Step 400.

In Step 404, based on impact score information, the VV may determine that the specific version of the application has one or more vulnerabilities. In one or more embodiments, the VV may determine the vulnerabilities using the information received from the device emulation orchestration engine.

In one or more embodiments of the invention, for example, the information received from the device emulation orchestration engine may specify that the client device has requested to upgrade from application v1.2 to application v1.3. The VV may then analyze the impact score information of the application v1.3. Based on the analysis, the VV may determine that the application v1.3 has vulnerabilities. An example of the analysis is described below in reference to FIG. 5.

In Step 406, based on the determination, the VV may identify at least one fix for at least one of the vulnerabilities. The VV may then send a request (e.g., a fix obtainment request) to the device emulation orchestration engine. In one or more embodiments, the request may include, but is not limited to: a name of at least one fix, a size of at least one fix, etc.

In Step 408, based on receiving the request from the VV, the device emulation orchestration engine may make an API call to the application upgrade repository (e.g., 136, FIG. 1) to obtain the at least one fix. In one or more embodiments, based on receiving the API call from the device emulation orchestration engine, the application upgrade repository may allow the device emulation orchestration engine to obtain the at least one fix. After obtaining the at least one fix, the device emulation orchestration engine may then send the at least one fix to the device emulation agent.

In Step 410, the device emulation orchestration engine may request an emulation from the device emulation agent to generate an application upgrade strategy. In one or more embodiments, the device emulation agent may use the at least one fix to generate the application upgrade strategy.

In Step 412, the device emulation agent may execute the emulation to generate the application upgrade strategy.

Turning now to FIG. 4.2, the method shown in FIG. 4.2 may be executed by, for example, the above-discussed device emulation orchestration engine, the device emulation agent, the application monitoring agent, the slice engine (e.g., 304, FIG. 3), and the slice mapper (e.g., 308, FIG. 3). Other components of the system (100) illustrated in FIG. 1 may also execute all or part of the method shown in FIG. 4.2 without departing from the scope of the invention.

In Step 414, the device emulation agent sends the application upgrade strategy to the device emulation orchestration engine.

In Step 416, the device emulation orchestration engine sends the application upgrade strategy and the at least one fix to the application monitoring agent.

In Step 418, the application monitoring agent sends the application upgrade strategy and the at least one fix to the slice engine.

In Step 420, the slice engine may request mapping of the at least one fix and the application upgrade strategy to a low priority network slice from the slice mapper. In one or more embodiments, after receiving the at least one fix, the slice engine may obtain metadata of the at least one fix from the application upgrade repository. Based on the metadata of the at least one fix, the slice engine may determine that the at least one fix is a non-urgent fix. Details of the metadata of the at least one fix are described above in reference to FIG. 3.

In one or more embodiments of the invention, the slice engine may then send a result of the determination, the at least one fix, and the application upgrade strategy to the configuration engine (e.g., 306, FIG. 3). In one or more embodiments, based on the configuration instructions and the result of the determination, the configuration engine may determine that the at least one fix and the application upgrade strategy should be mapped to the low priority network slice (see, e.g., FIG. 6.1). The configuration engine may then send the configuration instruction(s) of the at least one fix to the slice mapper.

In Step 422, based on the configuration instructions, the slice mapper may map the at least one fix (e.g., a fix for application 8) and the application upgrade strategy to the low priority network slice (see, e.g., FIG. 6.2).

In Step 424, a first determination is made about whether a second application upgrade request is received. If the result of the first determination is NO, the method proceeds to Step 426. If the result of the first determination is YES, the method proceeds to Step 432.

In one or more embodiments of the invention, the client device upgrade manager may execute the first determination by monitoring the client device. If the client device upgrade manager receives the second request from the client device, the client device upgrade manager sends the second request to the application monitoring agent. The application monitoring agent may then send the second request to the device emulation orchestration engine.

Turning now to FIG. 4.3, the method shown in FIG. 4.3 may be executed by, for example, the above-discussed reordering engine (e.g., 114, FIG. 1), the client device upgrade manager, and the slice engine. Other components of the system (100) illustrated in FIG. 1 may also execute all or part of the method shown in FIG. 4.3 without departing from the scope of the invention.

In Step 426, the slice engine sends, via the low priority network slice, the application upgrade strategy and the at least one fix, respectively, to the reordering engine. In one or more embodiments, the reordering engine may store the application upgrade strategy and the at least one fix in persistent storage in the order that the at least one fix and the application upgrade strategy are received.

In one or more embodiments of the invention, as discussed above in reference to FIG. 1, while storing, the reordering engine may generate an index for the application upgrade strategy and for the at least one fix. The reordering engine may then add the indexes of the application upgrade strategy and the at least one fix, respectively, to the receiving queue. In one or more embodiments, for example, the receiving queue may already have one or more indexes of other items. For this reason, the reordering engine may add the indexes of the application upgrade strategy and the at least one fix to the receiving queue after the indexes of other items.

In Step 428, based on the receiving queue, the reordering engine sends the application upgrade strategy and the at least one fix to the client device upgrade manager. In one or more embodiments, based on the example discussed above in Step 426, the reordering engine may first send the other items listed in the receiving queue to the client device upgrade manager. The reordering engine may then send the application upgrade strategy and the at least one fix to the client device upgrade manager.

In Step 430, based on the application upgrade strategy and the at least one fix, the client device upgrade manager may initiate upgrading of the client device. In one or more embodiments, the client device upgrade manager may then notify, via a graphical user interface (GUI), the user about the completion of the upgrading.

In one or more embodiments of the invention, the GUI may be displayed on a display of a computing device (e.g., 700, FIG. 7) using functionalities of a display engine (not shown), in which the display engine is operatively connected to the computing device. The display engine may be implemented using hardware, software, or any combination thereof. A notification about the completion may be displayed in any visual format that would allow the user to easily comprehend (e.g., read and parse) the listed information.

In one or more embodiments of the invention, the method may end following Step 430.

Turning now to FIG. 4.4, the method shown in FIG. 4.4 may be executed by, for example, the above-discussed device emulation orchestration engine, the application monitoring agent, the slice mapper, the slice engine, the reordering engine, the client device upgrade manager, and the network function module (e.g., 310, FIG. 3). Other components of the system (100) illustrated in FIG. 1 may also execute all or part of the method shown in FIG. 4.4 without departing from the scope of the invention.

In Step 432, as a result of the first determination in Step 424 of FIG. 4.2 being YES and based on receiving the second request from the application monitoring agent, the device emulation orchestration engine may make an API call to the application upgrade repository to obtain the second fix related to the second request.

In one or more embodiments of the invention, based on receiving the API call from the device emulation orchestration engine, the application upgrade repository may allow the device emulation orchestration engine to obtain the second fix. After obtaining the second fix, the device emulation orchestration engine may then send the second fix to the application monitoring agent.

In Step 434, similar to Step 418 of FIG. 4.2, the application monitoring agent sends the second fix to the slice engine. In one or more embodiments, the application monitoring agent may also send the second request to the slice engine.

In Step 436, a second determination is made about whether the second request is urgent. If the result of the second determination is NO, the method proceeds to Step 438. If the result of the second determination is YES, the method proceeds to Step 446.

In one or more embodiments of the invention, the slice engine may execute the second determination by analyzing metadata of the second fix. After receiving the second request, the slice engine may obtain the metadata of the second fix from the application upgrade repository. Based on the metadata of the second fix, the slice engine may determine that the second fix is a non-urgent fix or an urgent fix. In this manner, the slice engine may also determine that the second request is a non-urgent request to an urgent request.

In Step 438, similar to Step 420 of FIG. 4.2, the slice engine may request mapping of the second fix to the low priority network slice from the slice mapper. In one or more embodiments, the slice engine sends the second fix and a result of the second determination to the configuration engine.

In one or more embodiments of the invention, based on the configuration instructions and the result of the second determination, the configuration engine may determine that the second fix should be mapped to the low priority network slice. The configuration engine may then send the configuration instruction(s) of the second fix to the slice mapper. Based on the configuration instruction(s), the slice mapper may map the second fix to the low priority network slice.

In Step 440, similar to Step 426 of FIG. 4.3, the slice engine sends, via the low priority network slice, the application upgrade strategy, the at least one fix, and the second fix, respectively, to the reordering engine. In one or more embodiments, the reordering engine may store the application upgrade strategy, the at least one fix, and the second fix in the order that the application upgrade strategy, the at least one fix, and the second fix are received.

In one or more embodiments of the invention, while storing, the reordering engine may generate an index for the application upgrade strategy, the at least one fix, and the second fix. The reordering engine may then add the indexes of the application upgrade strategy, the at least one fix, and the second fix, respectively, to the receiving queue.

In one or more embodiments of the invention, for example, the receiving queue may already have one or more indexes of other items. For this reason, the reordering engine may add the indexes of the application upgrade strategy, the at least one fix, and the second fix to the receiving queue after the indexes of other items.

In Step 442, based on the receiving queue, the reordering engine sends the application upgrade strategy, the at least one fix, and the second fix to the client device upgrade manager. In one or more embodiments, based on the example discussed above in Step 440, the reordering engine may first send the other items listed in the receiving queue to the client device upgrade manager. The reordering engine may then send the application upgrade strategy, the at least one fix, and the second fix to the client device upgrade manager.

In Step 444, based on the application upgrade strategy, the at least one fix, and the second fix, the client device upgrade manager may initiate upgrading of the client device. Similar to Step 430 of FIG. 4.3, the client device upgrade manager may then notify, via the GUI, the user about the completion of the upgrading.

In one or more embodiments of the invention, the method may end following Step 444.

In Step 446, as a result of the second determination in Step 436 being YES, a third determination is made about whether a high priority network slice exists. If the result of the third determination is NO, the method proceeds to Step 448. If the result of the third determination is YES, the method proceeds to Step 450.

In one or more embodiments of the invention, the slice engine may execute the third determination by sending an inquiry to the slice mapper. In response to the inquiry, the slice mapper sends a response to the slice engine. The response may include, but is not limited to: a name of each network slice available in a network, a type of each network slice available in a network, etc. Based on the response, the slice mapper may request the generation of a high priority network slice from the network function module.

In Step 448, based on receiving the request, the network function module may generate the high priority network slice.

Turning now to FIG. 4.5, the method shown in FIG. 4.5 may be executed by, for example, the above-discussed device emulation orchestration engine, the application monitoring agent, the slice mapper, the slice engine, the reordering engine, the client device upgrade manager, and the network function module. Other components of the system (100) illustrated in FIG. 1 may also execute all or part of the method shown in FIG. 4.5 without departing from the scope of the invention.

In Step 450, similar to Step 420 of FIG. 4.2, the slice engine may request mapping of the second fix to the high priority network slice from the slice mapper. In one or more embodiments, the slice engine sends the second fix and the result of the second determination (executed in Step 436) to the configuration engine. Based on the configuration instructions and the result of the second determination, the configuration engine may determine that the second fix should be mapped to the high priority network slice. The configuration engine may then send the configuration instruction(s) of the second fix to the slice mapper.

In one or more embodiments of the invention, because the second fix (e.g., a fix for application 8) is an urgent fix and based on the configuration instruction(s), the slice mapper may map the second fix to the high priority network slice (see, e.g., FIG. 6.3).

In Step 452, the network function module may reorder one or more fixes listed in the high priory network slice based on the second fix (see, e.g., FIG. 6.4). In one or more embodiments, the network function module may reorder the fixes listed in the high priority network slice to prioritize the second fix (e.g., the fix for application 8).

In Step 454, a fourth determination is made about whether a prerequisite fix is required. If the result of the fourth determination is NO, the method proceeds to Step 456. If the result of the fourth determination is YES, the method proceeds to Step 464.

In one or more embodiments of the invention, similar to Step 436 of FIG. 4.4, the slice engine may execute the fourth determination by analyzing the metadata of the second fix. Based on the metadata of the second fix, the slice engine may determine that a prerequisite fix is required.

In Step 456, the slice engine sends, via the high priority network slice, the second fix to the reordering engine. In one or more embodiments, the reordering engine may store the second fix in the persistent storage.

In one or more embodiments of the invention, while storing, the reordering engine may generate an index for the second fix. The reordering engine may then add the index of the second fix to the receiving queue. In one or more embodiments, similar to Step 440 of FIG. 4.4, the receiving queue may already have one or more indexes of other items. For this reason, the reordering engine may add the index of the second fix to the receiving queue after the indexes of other items.

In Step 458, the reordering engine may reorder the items listed in the receiving queue based on the second fix. In one or more embodiments, the reordering engine may reorder the receiving queue to prioritize the second fix. In this manner, the second fix may set to be sent to the client device upgrade manager prior to the other items.

In Step 460, the reordering engine sends the second fix to the client device upgrade manager. In one or more embodiments, because the second fix is an urgent fix, the reordering engine may only send the second fix to the client device upgrade manager.

In Step 462, based on the second fix, the client device upgrade manager may initiate upgrading of the client device. Similar to Step 430 of FIG. 4.3, the client device upgrade manager may then notify, via the GUI, the user about the completion of the upgrading.

In one or more embodiments of the invention, the method may end following Step 462.

In Step 464, as a result of the fourth determination in Step 454 being YES, the slice engine may request the prerequisite fix (e.g., a fix for application 9 in FIG. 6.5) from the device emulation orchestration engine. In one or more embodiments, the urgent fix (e.g., the fix for application 8 in FIG. 6.5) may be dependent on the prerequisite fix. Based on receiving the request from the slice engine, the device emulation orchestration engine may make an API call to the application upgrade repository to obtain the prerequisite fix.

In one or more embodiments of the invention, based on receiving the API call from the device emulation orchestration engine, the application upgrade repository may allow the device emulation orchestration engine to obtain the prerequisite fix. The device emulation orchestration engine may then send the prerequisite fix to the application monitoring agent.

In Step 466, similar to Step 418 of FIG. 4.2, the application monitoring agent sends the prerequisite fix to the slice engine.

In Step 468, the slice engine sends the prerequisite fix and the result of the fourth determination (executed in Step 454) to the slice mapper. Based on the result of the fourth determination, the slice mapper may map the prerequisite fix to the high priority network slice (see, e.g., FIG. 6.5).

In Step 470, the network function module may prioritize the prerequisite fix in the high priority network slice (see, e.g., FIG. 6.5). In this manner, the prerequisite fix may set to be sent to the reordering engine prior to the urgent fix.

Turning now to FIG. 4.6, the method shown in FIG. 4.6 may be executed by, for example, the above-discussed slice engine, the reordering engine, and the client device upgrade manager. Other components of the system (100) illustrated in FIG. 1 may also execute all or part of the method shown in FIG. 4.6 without departing from the scope of the invention.

In Step 472, the slice engine sends, via the high priority network slice, the prerequisite fix and the second fix, respectively, to the reordering engine. In one or more embodiments, the reordering engine may store the prerequisite fix and the second fix in the persistent storage in the order that the prerequisite fix and the second fix are received.

In one or more embodiments of the invention, while storing, the reordering engine may generate an index for the prerequisite fix and for the second fix. The reordering engine may then add the indexes of the prerequisite fix and the second fix, respectively, to the receiving queue. In one or more embodiments, similar to Step 440 of FIG. 4.4, the receiving queue may already have one or more indexes of other items. For this reason, the ordering engine may add the indexes of the prerequisite fix and the second fix to the receiving queue after the indexes of other items.

In Step 474, the reordering engine may reorder the items listed in the receiving queue based on the prerequisite fix and the second fix. In one or more embodiments, the reordering engine may reorder the receiving queue to prioritize the prerequisite fix and the second fix. In this manner, the prerequisite fix and the second fix may be set to be sent to the client device upgrade manager prior to the other items.

In Step 476, the reordering engine sends the prerequisite fix and the second fix to the client device upgrade manager. In one or more embodiments, because the second fix is an urgent fix and the second fix is dependent on the prerequisite fix, the reordering engine may only send the prerequisite fix and the second fix to the client device upgrade manager.

In Step 478, based on the prerequisite fix and the second fix, the client device upgrade manager may initiate upgrading of the client device. Similar to Step 430 of FIG. 4.3, the client device upgrade manager may then notify, via the GUI, the user about the completion of the upgrading.

In one or more embodiments of the invention, the method may end following Step 478.

Figure 5:
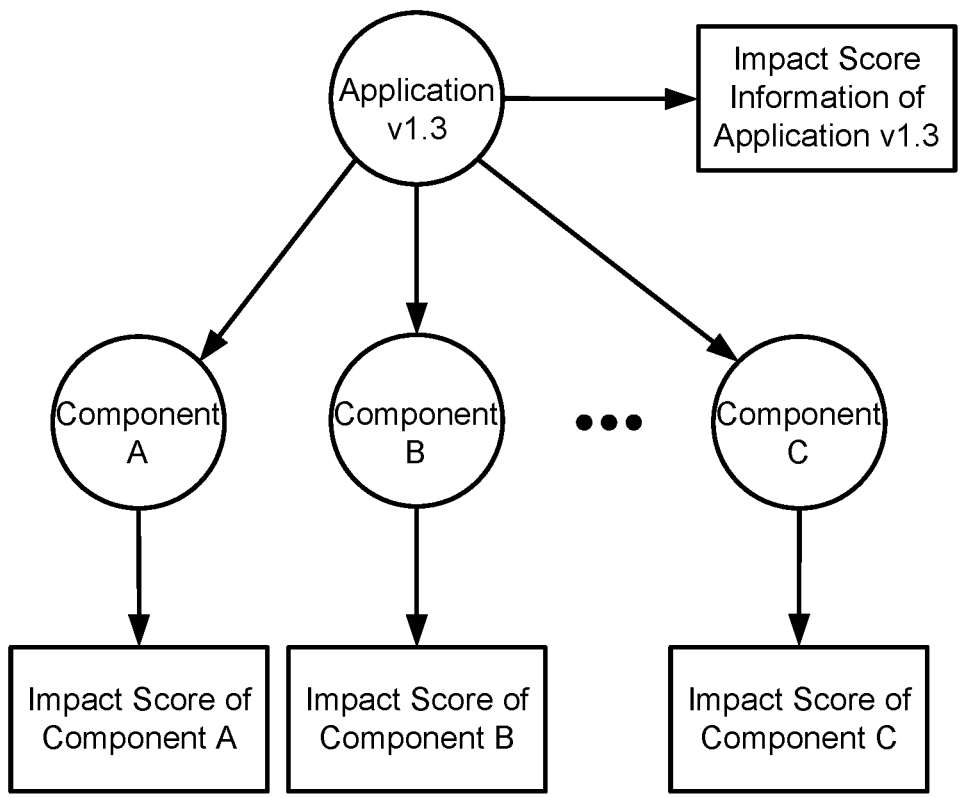
FIG. 5 shows a diagram of a forest tree database in accordance with one or more embodiments of the invention.

Turning now to FIG. 5, FIG. 5 shows a diagram of a forest tree database in accordance with one or more embodiments of the invention. In one or more embodiments of the invention, for a given client device, the forest tree database may include, but is not limited to: a name of an application, a name of a subcomponent of an application, an impact score information of an application, an impact score of a subcomponent of an application, etc. In one or more embodiments, the subcomponent of the application may include, but is not limited to: a dynamically linked library, an archive file, etc.

In one or more embodiments of the invention, based on the impact score information of the application (e.g., application v1.3), the VV (e.g., 150, FIG. 1) may determine that application v1.3 has one or more vulnerabilities. To execute the determination, the VV (e.g., 150, FIG. 1) may calculate the vulnerabilities of application v1.3 based on a scoring system (e.g., a common vulnerability scoring system). In one or more embodiments, while executing the calculation, the VV (e.g., 150, FIG. 1) may take into account one or more impact factor parameters. The impact factor parameters may include, but are not limited to: an attack vector, an attack complexity, a base score, a base severity, etc.

Those skilled in the art will appreciate that while the common vulnerability scoring system is used to calculate vulnerabilities of an application, any other scoring system may be used to calculate the vulnerabilities of the application without departing from the scope of the invention.

In one or more embodiments, the scoring system may take into account the impact score of one or more subcomponents (e.g., component A, component B, component C) of application v1.3 to generate the impact score information of application v1.3. In one or more embodiments, the average impact score of the subcomponents may be determined and compared against a predetermined impact score information threshold (e.g., less than or equal to 90%). If the average impact score is below the predetermined threshold, application v1.3 may be classified as having vulnerabilities.

In one or more embodiments of the invention, for example, consider a scenario in which the impact score of component A is 90%, the impact score of component B is 95%, and the impact score of component C is 75%. In this scenario, the average impact score may be calculated as 86.7%, which is below the predetermined threshold. For this reason, application v1.3 may be classified as having vulnerabilities.

In one or more embodiments of the invention, as yet another example, consider a scenario in which the impact score of component A is 95%, the impact score of component B is 95%, and the impact score of component C is 95%. In this scenario, the average impact score may be calculated as 95%, which is above the predetermined threshold. For this reason, application v1.3 may be classified as having no vulnerabilities.

Start of Example

The following section describes an example of one or more embodiments. The example, illustrated in FIGS. 6.1-6.5, is not intended to limit the scope of the embodiments disclosed herein and is independent from any other examples discussed in this application.

Turning to the example, consider a scenario in which an example network includes a low priority network slice, a normal priority network slice, and a high priority network slice. For the sake of brevity, not all components of the example network may be illustrated in FIG. 6.1.

Initially, FIG. 6.1 shows a diagram of the example network. Based on the network characteristics of the high priority network slice, at least a fix for application 1 and a fix for application 2 are deployed into the high priority network slice. Similarly, based on the network characteristics of the normal priority network slice, at least a fix for application 3, a fix for application 4, and a fix for application 5 are deployed into the normal priority network slice. Further, based on the network characteristics of the low priority network slice, at least a fix for application 6 and a fix for application 7 are deployed into the low priority network slice.

At this time, all fixes are set to be sent via the corresponding network slice to provide services to the user(s). The example, illustrated in FIGS. 6.2 and 6.3, is at a later point in time.

Turning now to FIG. 6.2, FIG. 6.2 shows a diagram of the example network. The slice engine (not shown) has received a fix for application 8. After receiving the fix, the slice engine makes a first determination that the fix for application 8 is a non-urgent fix. Following this first determination, the slice engine requests mapping of the non-urgent fix to the low priority network slice from the slice mapper (not shown). Based on the request and one or more configuration instructions of the configuration engine (not shown), the slice mapper maps the non-urgent fix to the low priority network slice.

Following this mapping process: (i) the low priority network slice contains at least the fix for application 6, the fix for application 7, and the fix for application 8, (ii) the normal priority network slice contains at least the fix for application 3, the fix for application 4, and the fix for application 5, and (iii) the high priority network slice contains at least the fix for application 1 and the fix for application 2.

At this time, all fixes are set to be sent via the corresponding network slice to provide services to the user(s). More specifically, the non-urgent fix for application 8 is set to be sent via the low priority network slice.

Turning now to FIG. 6.3, FIG. 6.3 shows a diagram of the example network. Referring back to FIG. 6.2, based on the first determination, the slice engine determines that the fix for application 8 is an urgent fix. Following the first determination, the slice engine requests mapping of the urgent fix to the high priority network slice from the slice mapper. Based on the request and the configuration instructions of the configuration engine, the slice mapper maps the urgent fix to the high priority network slice.

Following this mapping process: (i) the low priority network slice contains at least the fix for application 6 and the fix for application 7, (ii) the normal priority network slice contains at least the fix for application 3, the fix for application 4, and the fix for application 5, and (iii) the high priority network slice contains at least the fix for application 1, the fix for application 2, and the fix for application 8.

At this time, all fixes are set to be sent via the corresponding network slice to provide services to the user(s). More specifically, the urgent fix for application 8 is set to be sent via the high priority network slice.

Turning now to FIG. 6.4, FIG. 6.4 shows a diagram of the example network at yet a later point in time. Referring back to 6.3, based on the first determination, the slice mapper has mapped the urgent fix for application 8 to the high priority network slice. To prioritize sending of the urgent fix via the high priority network slice, the network function module (not shown) reorders the fixes listed in the high priority network slice based on the urgent fix.

Following this reordering process: (i) the low priority network slice contains at least the fix for application 6 and the fix for application 7, (ii) the normal priority network slice contains at least the fix for application 3, the fix for application 4, and the fix for application 5, and (iii) the high priority network slice contains at least the fix for application 8, the fix for application 1, and the fix for application 2, respectively.

At this time, the urgent fix for application 8 is set to be sent first via the high priority network slice.

Turning now to FIG. 6.5, FIG. 6.5 shows a diagram of the example network at yet a later point in time. Referring back to FIG. 6.4, after the reordering process, the slice engine makes a second determination that a fix for application 9 is required as a prerequisite fix. This is because the urgent fix for application 8 is dependent on the prerequisite fix. Following this second determination, the slice engine requests mapping of the prerequisite fix to the high priority network slice from the slice mapper. Based on the request, the slice mapper maps the prerequisite fix to the high priority network slice.

Following this mapping process, to prioritize sending of the prerequisite fix via the high priority network slice, the network function module reorders the fixes listed in the high priority network slice based on the prerequisite fix.

Following this reordering process: (i) the low priority network slice contains at least the fix for application 6 and the fix for application 7, (ii) the normal priority network slice contains at least the fix for application 3, the fix for application 4, and the fix for application 5, and (iii) the high priority network slice contains at least the fix for application 9, the fix for application 8, the fix for application 1, and the fix for application 2, respectively.

At this time, the prerequisite fix for application 8 and the urgent fix for application 8 are set to be sent first via the high priority network slice.

End of Example

Turning now to FIG. 7, FIG. 7 shows a diagram of a computing device in accordance with one or more embodiments of the invention.

In one or more embodiments of the invention, the computing device (700) may include one or more computer processors (702), non-persistent storage (704) (e.g., volatile memory, such as RAM, cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), an input device(s) (710), an output device(s) (708), and numerous other elements (not shown) and functionalities. Each of these components is described below.

In one or more embodiments, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a LAN, a WAN, such as the Internet, mobile network, or any other type of network) and/or to another device, such as another computing device.

In one or more embodiments, the computing device (700) may include one or more output devices (708), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing an application upgrade, the method comprising:
    making a first determination that an application to be installed on a client device has a vulnerability;
    identifying, based on the first determination, an urgent fix for the vulnerability, wherein the urgent fix is provided to an application monitoring agent and is used to generate an application upgrade strategy;
    making a second determination that the urgent fix and the strategy are received from the application monitoring agent;
    making, based on the second determination, a third determination that a high priority network slice of a network exists;
    mapping, based on the third determination, the urgent fix to the high priority network slice, wherein a first fix available in the high priority network slice is reordered to prioritize the urgent fix;
    making a fourth determination that a prerequisite fix is required,
        wherein the urgent fix is dependent on the prerequisite fix,
        wherein the fourth determination is verified via the strategy;
    mapping the prerequisite fix to the high priority network slice, wherein the prerequisite fix is set to be sent to a reordering engine prior to the urgent fix;
    sending the prerequisite fix and the urgent fix to the reordering engine via the high priority network slice;
    reordering a second fix available in a receiving queue of the reordering engine to prioritize the prerequisite fix and the urgent fix in the receiving queue;
    sending the prerequisite fix and the urgent fix to a client device upgrade manager; and
    initiating upgrading of the client device based on the prerequisite fix and the urgent fix.

2. The method of claim 1, wherein the prerequisite fix is a non-urgent fix.

3. The method of claim 1, wherein the prerequisite fix is a second urgent fix.

4. The method of claim 1, wherein the network comprises at least the high priority network slice and a low priority network slice.

5. The method of claim 4, wherein a first bandwidth allocated to the high priority network slice is greater than a second bandwidth allocated to the low priority network slice.

6. The method of claim 4, wherein the low priority network slice comprises at least one non-urgent fix.

7. The method of claim 1, wherein a device emulation system identifies the prerequisite fix.

8. A system for managing an application upgrade, the system comprising:
    a processor of a network slice controller (NSC) comprising circuitry;

memory of the NSC comprising instructions, which when executed perform a method, the method comprising:
  making a first determination that an urgent fix and an application upgrade strategy are received from an application monitoring agent (AMA),
    wherein a vulnerability validator (VV) makes a second determination that an application to be installed on a client device has a vulnerability,
    wherein, based on the second determination, the VV identifies the urgent fix for the vulnerability, wherein the urgent fix is provided to the AMA and is used to generate the strategy;
  making, based on the first determination, a third determination that a high priority network slice of a network exists;
  mapping, based on the third determination, the urgent fix to the high priority network slice, wherein a first fix available in the high priority network slice is reordered to prioritize the urgent fix;
  making a fourth determination that a prerequisite fix is required,
    wherein the urgent fix is dependent on the prerequisite fix,
    wherein the fourth determination is verified via the strategy;
  mapping the prerequisite fix to the high priority network slice, wherein the prerequisite fix is set to be sent to a reordering engine prior to the urgent fix; and
  sending the prerequisite fix and the urgent fix to the reordering engine via the high priority network slice,
    wherein the reordering engine reorders a second fix available in a receiving queue to prioritize the prerequisite fix and the urgent fix in the receiving queue,
    wherein the reordering engine sends the prerequisite fix and the urgent fix to a client device upgrade manager (CDUM), and
    wherein the CDUM initiates upgrading of the client device based on the prerequisite fix and the urgent fix.

9. The system of claim 8, wherein the prerequisite fix is a non-urgent fix.

10. The system of claim 8, wherein the prerequisite fix is a second urgent fix.

11. The system of claim 8, wherein the network comprises at least the high priority network slice and a low priority network slice.

12. The system of claim 11, wherein a first bandwidth allocated to the high priority network slice is greater than a second bandwidth allocated to the low priority network slice.

13. The system of claim 11, wherein the low priority network slice comprises at least one non-urgent fix.

* * * * *